United States Patent
Kikuchi et al.

(10) Patent No.: US 6,203,274 B1
(45) Date of Patent: Mar. 20, 2001

(54) STEAM TURBINE

(75) Inventors: Masataka Kikuchi, Chigasaki; Toru Takahashi, Yokohama; Nobuo Okita, Ushiku; Ryou Oda, Yokohama; Kenzo Matsuyama, Kawasaki; Akira Sakuma, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/296,420

(22) Filed: Apr. 23, 1999

(30) Foreign Application Priority Data

Apr. 24, 1998 (JP) .................................................. 10-115336

(51) Int. Cl.⁷ ...................................................... F01D 1/02
(52) U.S. Cl. ...................... 415/191; 415/195; 415/213.1; 415/216.1; 415/221; 415/229
(58) Field of Search ................................ 415/191, 199.4, 415/199.5, 213.1, 216.1, 220, 221, 229

(56) References Cited

U.S. PATENT DOCUMENTS

| | | | |
|---|---|---|---|
| 4,013,378 | * | 3/1977 | Herzog .................................. 415/209 |
| 4,780,057 | * | 10/1988 | Silvestri, Jr. ......................... 415/202 |
| 5,383,768 | | 1/1995 | Siga et al. ............................. 416/241 |
| 5,536,146 | | 7/1996 | Siga et al. ............................. 416/241 |
| 5,569,338 | | 10/1996 | Siga et al. ............................. 416/241 |
| 5,624,235 | | 4/1997 | Siga et al. ............................. 416/241 |
| 5,749,228 | * | 5/1998 | Shiga et al. ............................. 60/679 |
| 5,961,284 | * | 10/1999 | Kuriyama et al. ........................ 415/2 |
| 6,074,169 | * | 6/2000 | Siga et al. ............................. 416/202 |

FOREIGN PATENT DOCUMENTS

| | | |
|---|---|---|
| 3-130502 | 6/1991 | (JP) . |
| 10-184306 | 7/1998 | (JP) . |

OTHER PUBLICATIONS

Development and Design Features of Single Cylinder Reheat Turbine Plant, MITSUBISHI JUKO G1HO, vol. 17, No. 2, (1980), pp. 33–39. (with English abstract).

* cited by examiner

Primary Examiner—Edward K. Look
Assistant Examiner—Ninh Nguyen
(74) Attorney, Agent, or Firm—Foley & Lardner

(57) ABSTRACT

The present invention is intended to implement a high-temperature, high-pressure, high-output, high/low-pressure integrated steam turbine provided with a turbine rotor formed as an integral rotor member.

It is provided with a high-pressure turbine (3) to which primary steam (20) is supplied, a low-pressure turbine (5) having last-stage turbine rotor blades (47), a turbine rotor (2) formed of an integral rotor member, an integral casing (6), and a downward-exhaust type of exhaust chamber (15); it has a rated power of at least 100 MW; the last-stage turbine rotor blades are rotor blades of an effective blade length of at least 36 inches rotating at 3000 rpm, or are rotor blades of an effective blade length of at least 33.5 inches rotating at 3600 rpm; and a bearing (1) that is either a high-pressure-side journal bearing (1) or a low-pressure-side journal bearing (11) is installed in a foundation portion (10, 12) on which at least one portion of the casing is provided, and the other bearing (11) is installed at a distance from that foundation portion.

48 Claims, 19 Drawing Sheets

蒸気出口側から見る

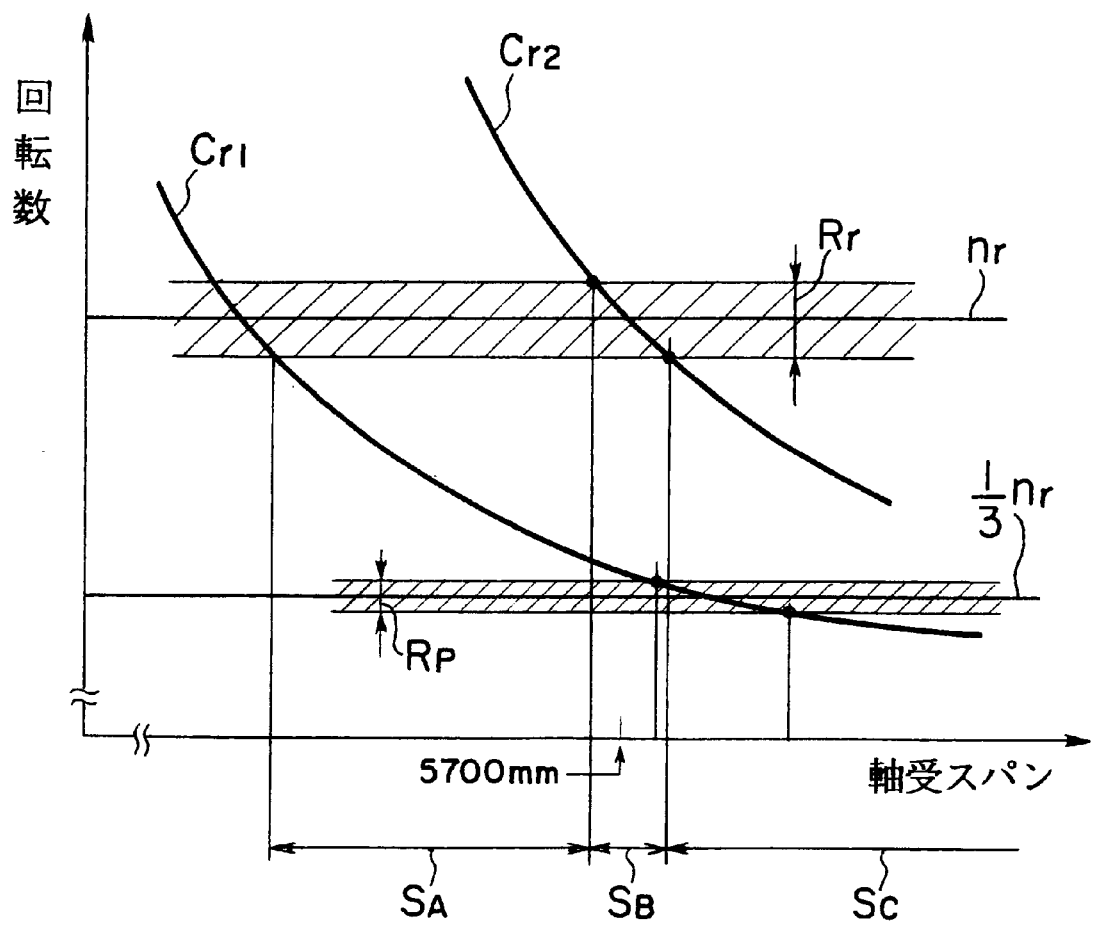
F I G. 10

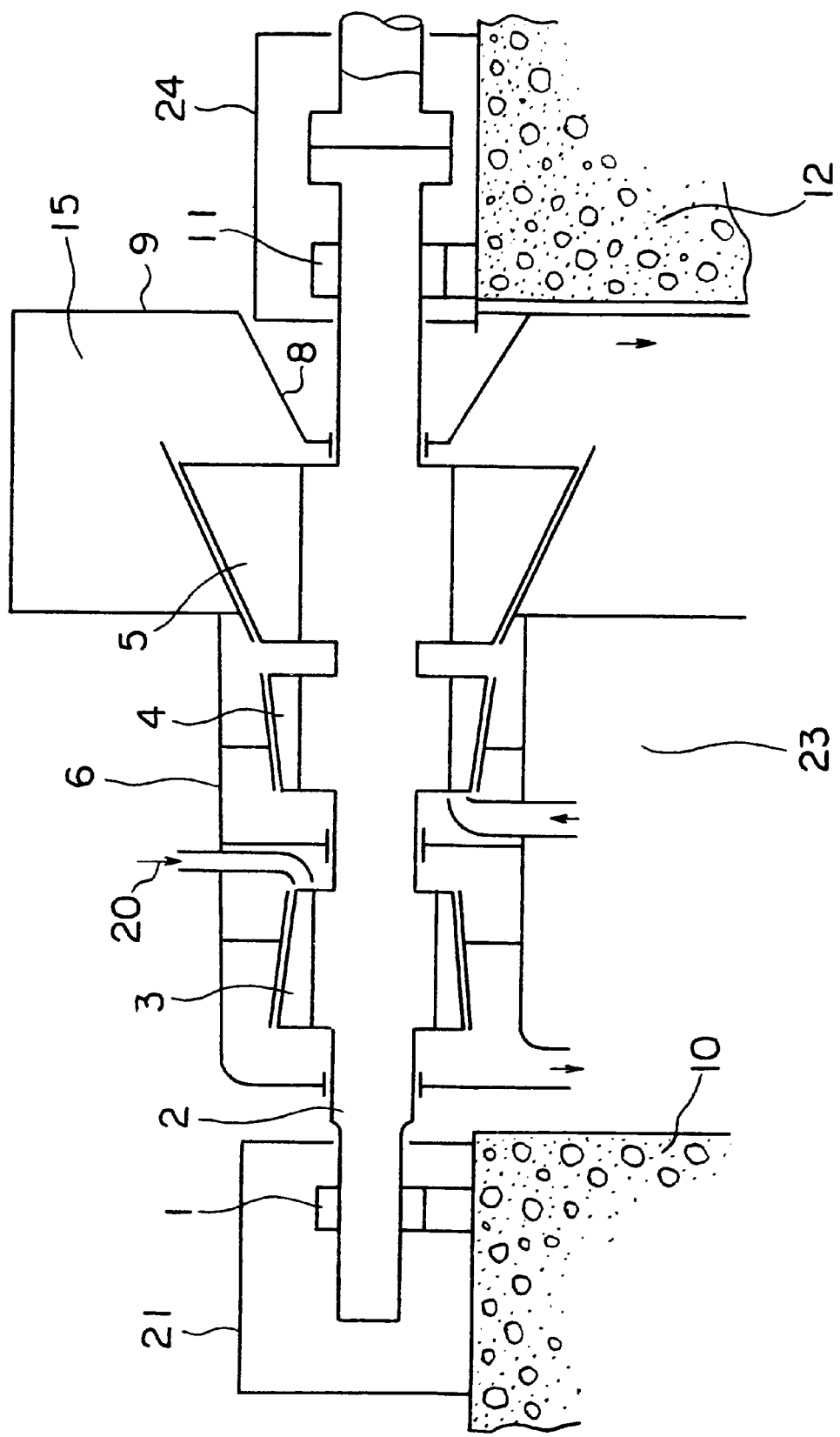
F I G. 12

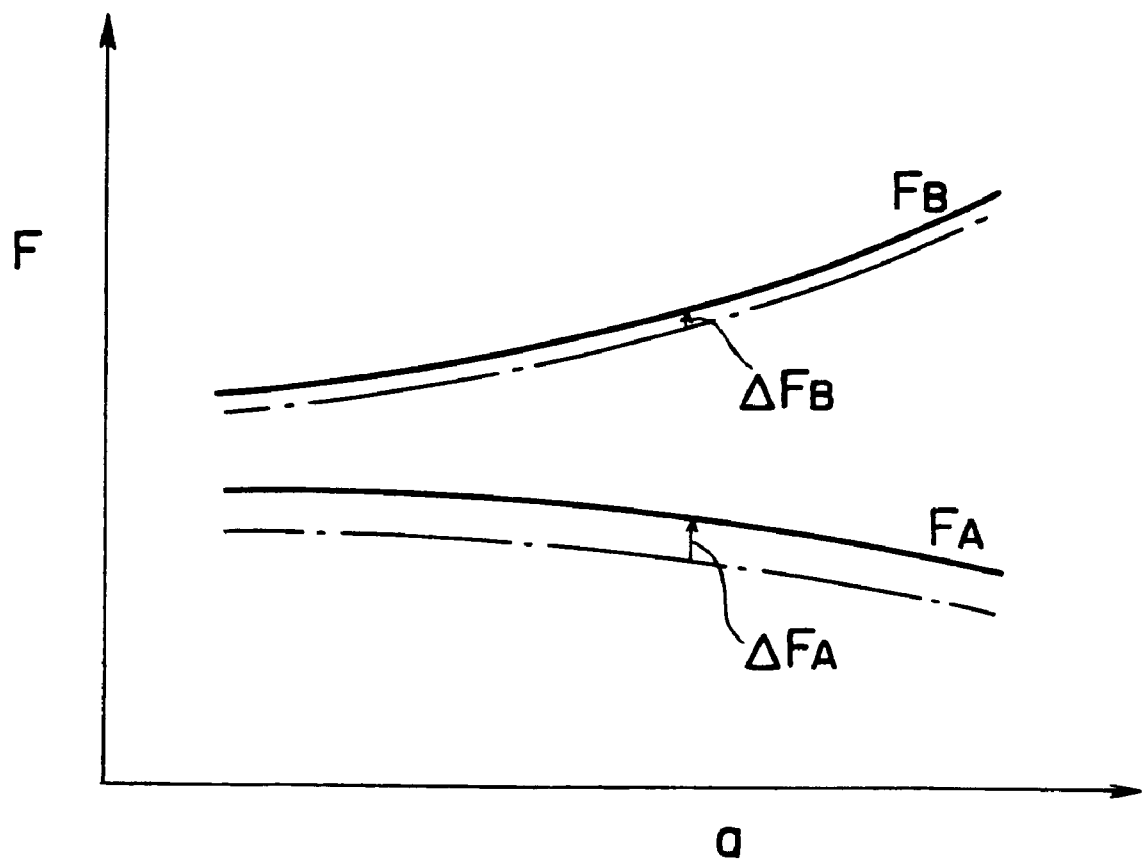
F I G. 15

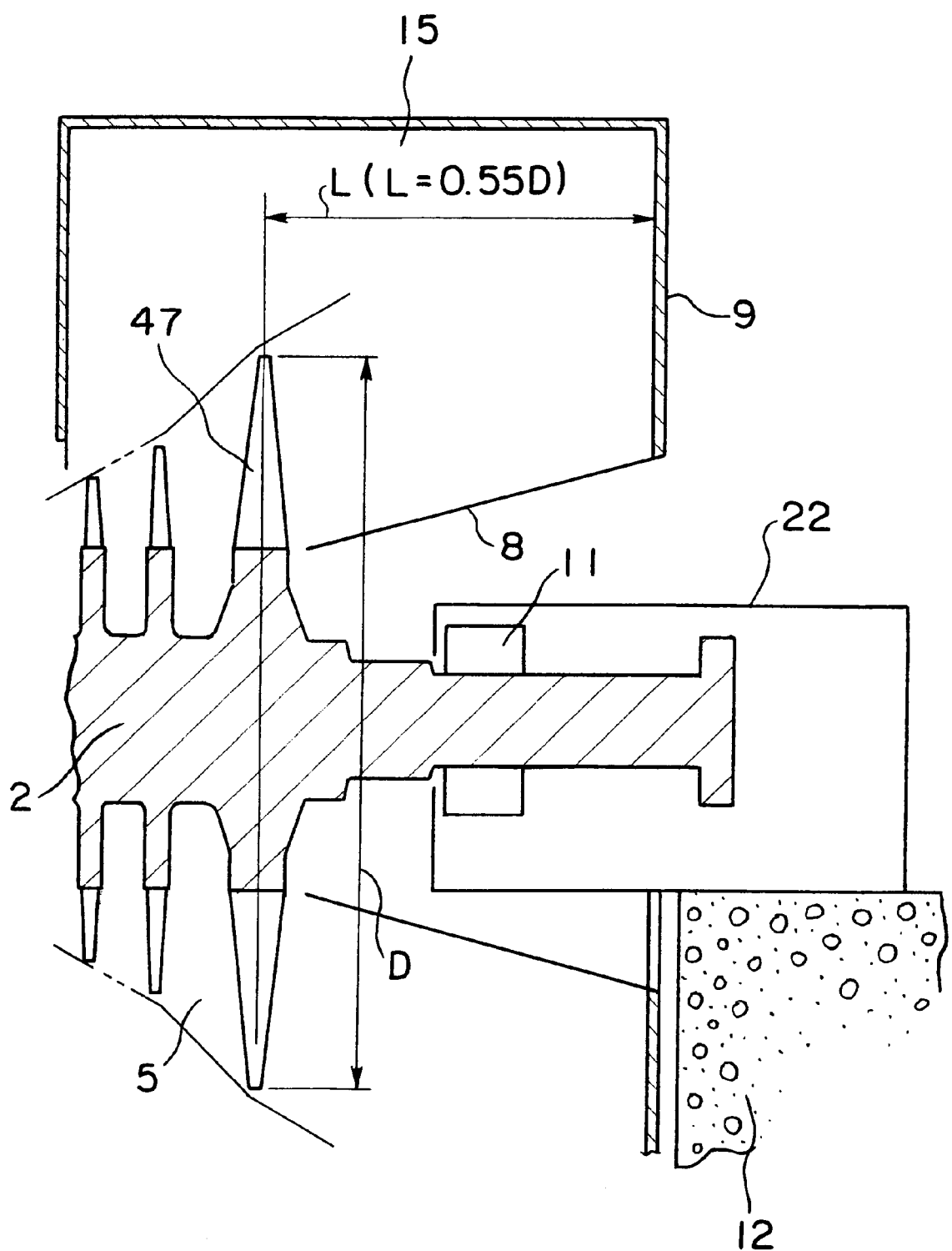
F I G. 17

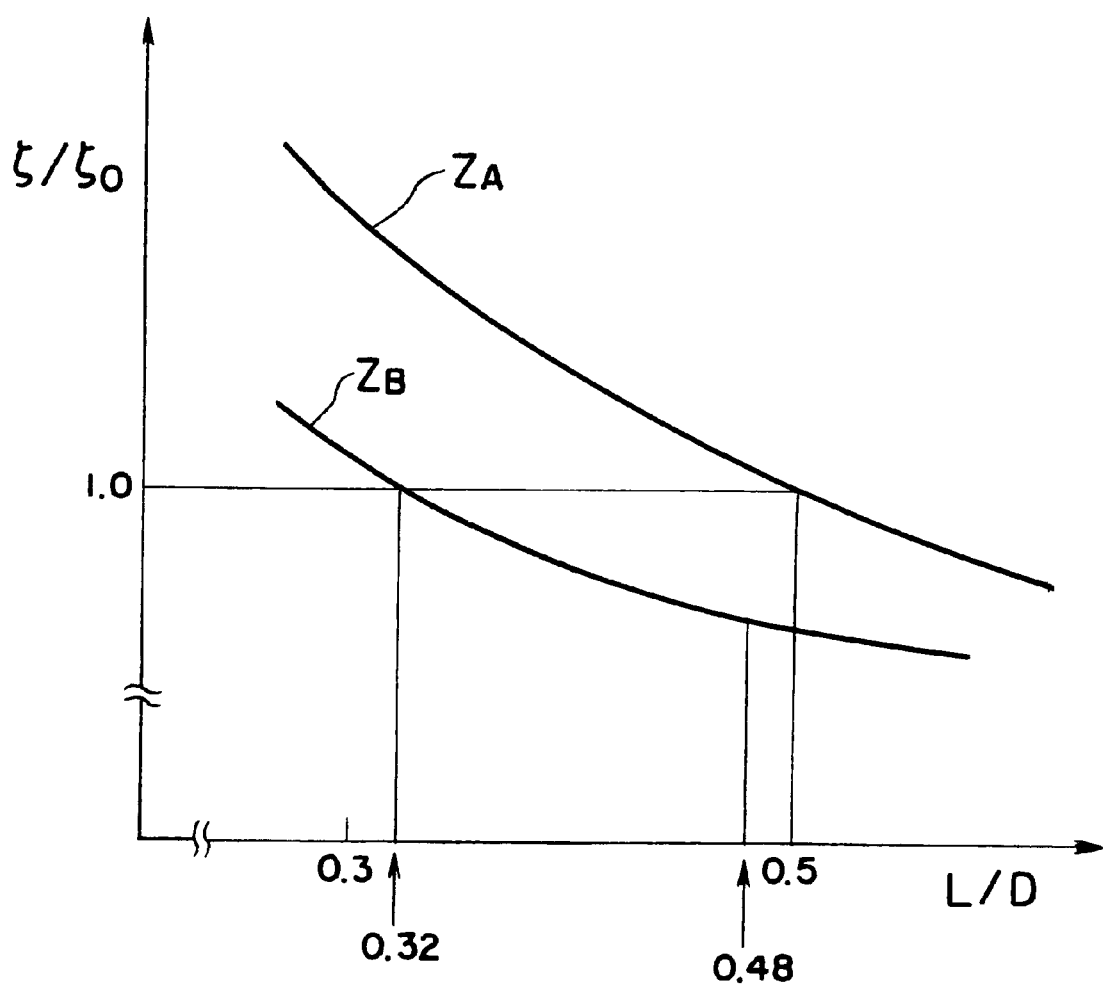
F I G. 19

STEAM TURBINE

TECHNICAL FIELD

The present invention relates to a steam turbine and, in particular, to a high-temperature, high-pressure, high-output, high/low-pressure integrated steam turbine.

DESCRIPTION OF RELATED ART

Prior-Art Technique (1)

Technical difficulties, particularly those relating to countermeasures against shaft rotation, ensure that it is not yet possible to implement a practicable high/low-pressure integrated steam turbine which has a rated power of at least 100 MW under steam conditions of a primary steam pressure of at least 100 kg/cm$^2$ and a primary steam temperature of at least 500° C., and which has a downward-exhaust type of turbine exhaust with rotor blades of an effective blade length of at least 36 inches rotating at 3000 rpm or rotor blades of an effective blade length of at least 33.5 inches rotating at 3600 rpm (hereinafter referred to as "high-temperature, high-pressure, high-output conditions"); and which also has a high-pressure portion, an intermediate-pressure portion, and a low-pressure portion (or just a high-pressure portion and a low-pressure portion) on a turbine rotor formed of a single rotor shaft supported by two journal bearings, wherein all of these components are accommodated within an integral casing (hereinafter referred to as "single turbine rotor condition").

A prior-art high/low-pressure integrated steam turbine that satisfies the "high-temperature, high-pressure, high-output conditions" but does not satisfy the "single turbine rotor condition" utilizes a method such that a rotor 111 of high- and intermediate-pressure portions 103 and 104, or a single high-pressure portion, and a rotor 112 of a low-pressure portion 105 are each formed separately and each is accommodated within separate casings 106 and 107, and these rotors 111 and 112 are joined together by a coupling 113, as shown in FIGS. 11 and 13.

With a prior-art high/low-pressure integrated steam turbine that does not satisfy the "high-temperature, high-pressure, high-output conditions" but does satisfy the "single turbine rotor condition," it is possible to set a comparatively high stiffness for the shaft linkage, so that two bearings 1 and 11 can be disposed each on foundation portions 10 and 12, as shown in FIG. 12.

Prior-Art Technique (2)

With a prior-art high/low-pressure integrated steam turbine that does not satisfy the "high-temperature, high-pressure, high-output conditions" but does satisfy the "single turbine rotor condition," the output power is small because of the lower primary steam pressure and temperature, so the bearing span is comparatively short and therefore the bearing load is distributed suitably between the front bearing disposed at the high-pressure side of the high/low-pressure integrated steam turbine and the rear bearing disposed at the low-pressure side thereof, which means that it is possible to design a turbine that is stable with respect to shaft vibration.

Prior-Art Technique (3)

As previously mentioned, the technical difficulties involved with a high/low-pressure integrated steam turbine that satisfies both the "high-temperature, high-pressure, high-output conditions" and the "single turbine rotor condition" ensure that it is not yet possible to implement such a turbine in practice.

A prior-art steam turbine has a multiple casing formed of a plurality of casings, as shown in FIG. 11, with each of the high/intermediate-pressure rotor (or high-pressure rotor) and the low-pressure rotor having two bearings. Alternatively, three bearings are provided for the two rotors which are in a coupled state, as shown in FIG. 13. In such a multiple-casing steam turbine, the bearing span of each rotor is shorter than that of a high/low-pressure integrated steam turbine and thus the stiffness thereof is extremely high, so it is possible to ensure favorable characteristics for shaft vibration, even when the number of turbine stages configured of paired static and rotating turbine blades is increased and thus the bearing span increases slightly.

Prior-Art Technique (4)

As previously mentioned, the configuration of a steam turbine in the prior art that satisfies the "high-temperature, high-pressure, high-output conditions" is as shown in FIG. 11 or FIG. 13. Alternatively, a downward-exhaust type of high/low-pressure integrated steam turbine has a conical shape of the exhaust chamber that is of a form called a linear circular-cone shape, as shown in FIG. 12.

Prior-Art Technique (5)

The configuration of another steam turbine in the prior art that satisfies the "high-temperature, high-pressure, high-output conditions" has a conical shape of the exhaust chamber that is of a form called a linear circular-cone shape (see FIG. 12), wherein the axial length L of the exhaust chamber is increased so that the shape of the exhaust chamber is such that the ratio L/D is greater than 0.5, as shown in FIG. 17, with the object of ensuring the exhaust efficiency.

Prior-Art Technique (6)

The configuration of yet another steam turbine in the prior art that satisfies the "high-temperature, high-pressure, high-output conditions" has a conical shape of the exhaust chamber that has a vertical cross-section of a form called a linear circular-cone shape, as shown in FIG. 12.

Technical Problem (1)

With a turbine wherein the conditions of the steam flowing into the steam turbine are a high temperature and a high pressure generally leads to an increase in the number of stages, increasing the output power generally causes an increase in the number of stages. This means that, with a high/low-pressure integrated steam turbine using a single turbine rotor supported by two journal bearings, the bearing span generally increases as the power output increases.

With a high/low-pressure integrated steam turbine, all of the stages from the high-pressure side to the low-pressure side are provided on a single rotor, so the length of that single rotor is increased. If the rated output is increased by making the steam conditions of the in-flowing primary steam (main steam) a high temperature and a high pressure, therefore, which makes the design difficult from the vibration viewpoint because the ratio S/Do of the bearing span S and the outer diameter Do of the rotor shaft increases, leading to a reduction in the stiffness of the shaft and a tendency for the eigenvalue of the shaft assembly to drop. In addition, the steam flowrate also generally increases, so that the lengths of the longer blades in the final stages increase, thus increasing the additional weight which is a factor in the drop of the eigenvalue of the shaft assembly, which means that a high level of technical skill is necessary to ensure favorable vibration characteristics.

In particular, when it comes to implementing a high-temperature, high-pressure, high-output, high/low-pressure integrated steam turbine that satisfies both the "high-temperature, high-pressure, high-output conditions" and the "single turbine rotor condition" in practice, problems occur in the use of the prior art without modifications, because the bearing span increases and thus the critical speeds fall, with the secondary critical speed in particular approaching the rated speed so that detuning is insufficient, or the secondary critical speed matching the rated speed, so it is difficult to achieve stable operation.

Increasing the diameter of the rotor shaft is an effective method of solving these problems in the prior art, but the resultant narrowing of clearance dimensions in the radial direction between the static portions and the rotating portions causes difficulties from the viewpoint of preventing rubbing, so that thickening the rotor diameter causes an increase in the clearance area, which leads to an increase in leakage losses and a deterioration in efficiency. In addition, if the diameter of the blade attachment portions (turbine wheel) is increased by a thickening of the rotor shaft assembly, the blade length becomes shorter and secondary flow losses increase, which also leads to a deterioration in efficiency. Therefore, thickening the rotor shaft assembly cannot be greatly recommended as a method of solving vibration problems in the implementation of a high-temperature, high-pressure, high-output, high/low-pressure integrated steam turbine.

Thus, when it comes to implementing a high-temperature, high-pressure, high-output, high/low-pressure integrated steam turbine that satisfies both the "high-temperature, high-pressure, high-output conditions" and the "single turbine rotor condition" in practice, the increase in additional weight of the shaft assembly caused by the increase in bearing span means that, if the two bearings that support the rotor are disposed directly above foundation portions, the stiffness of the turbine shaft assembly is reduced by the resultant increase in the bearing span, which causes a technical problem in that it is difficult to ensure favorable shaft vibration characteristics.

Technical Problem (2)

As shown in FIG. 14, the weight W of a high/low-pressure integrated steam turbine is supported by a front bearing and a rear bearing, so that the load is divided into a front-bearing load FA and a rear-bearing load FB. The rotor is subjected to reactive forces of the same magnitude from the bearings; i.e., a front-bearing reactive force RA and a rear-bearing reactive force RB. The position of the center of gravity of the rotor is denoted by G.

When it comes to implementing a high/low-pressure integrated steam turbine that satisfies both the "high-temperature, high-pressure, high-output conditions" and the "single turbine rotor condition" in practice, the proportion of the high-pressure portion (or the high- and intermediate-pressure portion) borne by the bearing span becomes greater, the load on the front bearing is reduced because the last-stage rotor blades, which are long and heavy, are positioned relatively closer to the rear bearing, and thus it is expected that the bearing characteristics at the front bearing will approach an unstable region and they may even enter that unstable region. It is therefore difficult to implement a high-power high/low-pressure integrated steam turbine under the high levels of pressure and temperature imposed by the above conditions.

Technical Problem (3).

It is usual for a high/low-pressure integrated steam turbine to have a single turbine rotor and for the number of turbine stages to be increased if the output power of the turbine is to be raised at high temperatures and pressures, and it is therefore usual for the bearing span to lengthen as the output power increases.

When it comes to implementing a high/low-pressure integrated steam turbine that satisfies both the "high-temperature, high-pressure, high-output conditions" and the "single turbine rotor condition" in practice, a problem occurs if a rotor shaft designed for a prior-art high/low-pressure integrated steam turbine that does not satisfy these conditions is used without any change to the outer diameter. The resultant increase in bearing span will ensure that the stiffness of the shaft assembly is insufficient, the critical speeds will fall until there is insufficient detuning thereof with respect to the rated speed, and thus the shaft vibration will increase.

Since all the turbine stages from the high-pressure end to the low-pressure end are installed on a single rotor in a high/low-pressure integrated steam turbine, the length of that single rotor increases and therefore the ratio $S/Do$ of the bearing span S to the outer diameter Do of the rotor shaft increases, so that when it comes to implementing a practicable high/low-pressure integrated steam turbine that satisfies the above conditions within the existing range of outer diameters of rotor shafts of prior-art high/low-pressure integrated steam turbines, the eigenvalue of the shaft assembly will fall, with the secondary critical speed in particular approaching the rated speed so that detuning thereof is insufficient, or it may even match the rated speed, raising a technical problem in that it is difficult to achieve stable operation.

If the bearing span is made even longer, the critical speeds will drop so far that the secondary critical speed will fall below the rated speed and thus detuning of the secondary critical speed can once again be ensured, but in such a case a further problem occurs with the turbine start-up characteristics, as is clear from FIG. 10. That is to say, when a turbine starts up in a combined cycle, for example, it is usual to set an operating mode called a purge operation, to flush out any impurities that have accumulated in the flow passages. The rotational speed of the turbine during this purge operation (the purge speed) is usually set to one-third of the rated speed nr (for a 3600-rpm machine, the purge speed would be 1200 rpm, by way of example) and the operation of the steam turbine is maintained for a fixed time at that purge speed. In this case, nr in FIG. 10 denotes the rated speed, Rr denotes the rated speed detuning region (tuning zone for avoiding a coincidence with an eigenvalue), Rp denotes the purge speed detuning region when the purge speed is set to nr/3, Cr1 denotes the primary critical speed, Cr2 denotes the secondary critical speed, SA denotes region wherein the bearing span can be set, SB denotes the region wherein the bearing span cannot be set, and SC denotes the region wherein bearing span setting is possible but the purge speed must be set to less than nr/3 (leading to operation deterioration).

Among the comparatively small high/low-pressure integrated steam turbines that have been implemented in the past, a turbine having a rated speed of 3600 rpm or 3000 rpm generally has a purge speed that is lower than the primary critical speed. However, if the bearing span is increased and thus the primary critical speed of the shaft assembly drops, it may approach or even match the purge speed, so that large amounts of shaft vibration will occur during the purge, which will impede operation. In such a case, methods could be considered for raising the purge speed so that it moves away from the primary critical speed, but these cannot be recommended because the purge operation is operation in an unloaded state so that raising the rotational speed will increase flow damage to the long blades of the turbine, which will raise the temperature of the long blades even further and also fluid-induced tension acting on the long blades will increase, which raises the danger of damage to the long blades of the turbine. Methods could be considered for lowering the purge speed so that it moves away from the primary critical speed, on the other hand, but such methods are difficult to recommend because the flowrate of fluid passing through the passages will be slower and the effects of the purge will be extremely reduced, so that the time required for the purge will be greatly extended and thus the start-up time will be longer, leading to a deterioration of the turbine start-up characteristics.

If the minimum shaft diameter at the central portion of the rotor shaft of a high/low-pressure integrated steam turbine is on the order of 500 mm, in a similar manner to prior-art practice, increasing the bearing span to at least 5700 mm makes it possible to detune the secondary critical speed to below the rated speed, but there is an increased danger that the primary critical speed will approach or even match the purge speed which is usually set to one-third of the rated speed nr, as previously mentioned. Lowering the purge speed to prevent this event is cause problems in that it would lead inevitably to a large deterioration in the turbine start-up characteristics.

It should be noted that the minimum diameter of the central portion of the rotor shaft is defined as the minimum value of the shaft diameters at all the various positions of the rotor, within a region from a position at one-quarter of the bearing span to a position at three-quarters of the bearing span.

Technical Problem (4)

If the shape of the conical portion of the exhaust chamber is an unmodified linear circular cone, as in the prior art, the exhaust flow strikes the downstream-side wall of the exhaust chamber in a state close to perpendicular thereto, which increases the exhaust losses and worsens the turbine performance. That is why it is necessary to increase the distance in the axial direction of the exhaust chamber when using an unmodified circular conical shape in the exhaust chamber but wishing to ensure the necessary exhaust efficiency, to make sure that the exhaust flow is slowed sufficiently before it strikes the downstream-side wall of the exhaust chamber. However, this configuration increases the axial length L of the exhaust chamber and consequently lengthens the bearing span of the turbine, so the stiffness of the turbine shaft falls, the eigenvalue of the turbine shaft assembly drop, and large amounts of vibration are likely to occur. A method of thickening the shaft diameter to suppress the drop in eigenvalue could be considered as a measure for preventing this vibration, but increasing the shaft diameter generally increases the leakage losses and worsens the efficiency greatly, leading to a corresponding efficiency deterioration that is greater than the efficiency improvement obtained by increasing the axial length of the exhaust chamber, so it is difficult to employ this method because it tends to worsen the overall efficiency of the turbine.

For the above reasons, there are difficulties involved with implementing a high-performance, high-power, high/low-pressure integrated steam turbine that satisfies both the "high-temperature, high-pressure, high-output conditions" and the "single turbine rotor condition," where the high-pressure portions and the low-pressure portions are accommodated within a single housing.

In addition, with a high/low-pressure integrated steam turbine having large last-stage rotor blades (LSB), such as a 3000-rpm machine having last-stage turbine rotor blades of an effective blade length of at least 36 inches or a 3600-rpm machine having last-stage turbine rotor blades of an effective blade length of at least 33.5 inches, the weight of the rotor blades and the weight of the wheels (which act as additional weight on the turbine shaft assembly) are dramatically increased, leading to a drop in the eigenvalue of the turbine shaft assembly. Thus, use of prior-art techniques without modification brings the designer up against difficult technical problems in the implementation of a high-power high/low-pressure integrated steam turbine, such as an increase in shaft vibration due to insufficient detuning of the secondary critical speed.

Technical Problem (5)

If the shape of the conical portion of the exhaust chamber is an unmodified linear circular cone, as in the prior art, the exhaust flow strikes the downstream-side wall of the exhaust chamber in a state close to perpendicular thereto, forming vortices which cause the exhaust losses to increase and the turbine performance to worsen. That is why it is necessary to increase the distance in the axial direction of the exhaust chamber when using an unmodified circular conical shape in the exhaust chamber but wishing to ensure the necessary exhaust efficiency, to make sure that the exhaust flow is slowed sufficiently before it strikes the downstream-side wall of the exhaust chamber. However, this configuration increases the axial length L of the exhaust chamber and consequently lengthens the bearing span of the turbine, so the stiffness of the turbine shaft falls, the eigenvalue of the turbine shaft assembly drop, and large amounts of vibration are likely to occur. A method of thickening the shaft diameter to suppress the drop in eigenvalue could be considered as a measure for preventing this vibration, but increasing the shaft diameter generally increases the leakage losses and worsens the efficiency greatly, leading to a corresponding efficiency deterioration that is greater than the efficiency improvement obtained by increasing the axial length of the exhaust chamber, so it has been difficult to employ this method because it tends to worsen the overall efficiency of the turbine.

For the above reasons, there are difficulties involved with implementing a high-performance, high-power, high/low-pressure integrated steam turbine that satisfies both the "high-temperature, high-pressure, high-output conditions" and the "single turbine rotor condition."

If any of the various circular-cone shapes that have been used in the past for the conical portion of the exhaust chamber is used, the exhaust efficiency deteriorates because the exhaust flow strikes the downstream-side wall of the exhaust chamber in a state close to perpendicular thereto. To ensure the necessary exhaust efficiency, it is necessary to increase the distance in the axial direction (axial length L) of the exhaust chamber, to slow the exhaust flow down before it strikes the downstream-side wall of the exhaust chamber. With curved-surface exhaust too, the axial length of the exhaust chamber could be increased with the objective of improving the exhaust efficiency. For that reason, the bearing span of the turbine also lengthens so that the stiffness of the turbine shaft falls, inducing the critical speeds to drop, causing problems in that shaft vibration tends to increase in a state in which the secondary critical speed is close to the rated speed of the turbine. This leads to technical problems when implementing a steam turbine that satisfies the "high-temperature, high-pressure, high-output conditions" in practice, in that it is necessary to devise some sort of countermeasure that shortens the bearing span, even when creating a design that conforms to existing design methods to detune the secondary critical speed.

Technical Problem (6)

If the shape of the conical portion of the exhaust chamber is an unmodified circular cone, as in the prior art, the exhaust flow strikes the downstream-side wall of the exhaust chamber in a state close to perpendicular thereto, causing the exhaust losses to increase and the turbine performance to worsen. That is why it is necessary to increase the distance in the axial direction of the exhaust chamber when using an unmodified circular conical shape in the exhaust chamber but wishing to ensure the necessary exhaust efficiency, to make sure that the exhaust flow is slowed sufficiently before it strikes the downstream-side wall of the exhaust chamber. However, this configuration increases the axial length L of the exhaust chamber and consequently lengthens the bearing span of the turbine, so the stiffness of the turbine shaft falls, the eigenvalue of the turbine shaft assembly drop, and large amounts of vibration are likely to occur. A method of thickening the shaft diameter to suppress the drop in eigenvalue could be considered as a measure for preventing this vibration, but increasing the shaft diameter generally increases the leakage losses and worsens the efficiency greatly, leading to a corresponding efficiency deterioration that is greater than the efficiency improvement obtained by increasing the axial length of the exhaust chamber, so it has been difficult to employ this method because it tends to worsen the overall efficiency of the turbine.

DISCLOSURE OF INVENTION

In order to achieve the above objectives, a first aspect of the present invention provides a steam turbine comprising: a high-pressure turbine to which primary steam is supplied; a low-pressure turbine on a final-stage side of the high-pressure turbine and having last-stage turbine rotor blades; a turbine rotor formed as an integral rotor member by which the high-pressure turbine and the low-pressure turbine are coupled; an integral casing within which the high-pressure turbine and the low-pressure turbine are accommodated; a downward-exhaust type of exhaust chamber formed in the casing for exhausting in a downward direction exhaust steam that is expelled from the low-pressure turbine; a high-pressure-side journal bearing for supporting the turbine rotor in a rotatable manner on an initial-stage side of the high-pressure turbine; and a low-pressure-side journal bearing for supporting the turbine rotor in a rotatable manner on a final-stage side of the high-pressure turbine; wherein: the primary steam has a steam pressure of at least 100 kg/cm$^2$ and a steam temperature of at least 500° C.; the steam turbine has a rated power of at least 100 MW; the last-stage turbine rotor blades are rotor blades of an effective blade length of at least 36 inches rotating at 3000 rpm, or are rotor blades of an effective blade length of at least 33.5 inches rotating at 3600 rpm; and a bearing that is either the high-pressure-side journal bearing or the low-pressure-side journal bearing is installed in a foundation portion on which at least one portion of the casing is provided, and the other bearing is installed at a distance from that foundation portion.

In the above-described first aspect of this invention, a bearing that is either the high-pressure-side journal bearing or the low-pressure-side journal bearing is installed in a foundation portion on which at least one portion of the casing is provided, and the other bearing is installed at a distance from the foundation portion, so that the distance between the high-pressure-side journal bearing and the low-pressure-side journal bearing (the bearing span) can be shortened in comparison with a configuration in which the both of the high-pressure-side journal bearing and the low-pressure-side journal bearing is installed, which makes it possible to provide a compact high/low-pressure integrated steam turbine that can be adapted for higher temperatures, pressures, and power outputs with little shaft vibration and favorable operating characteristics, without leading to an increase in the rotor diameter which would cause a deterioration in efficiency.

A second aspect of this invention provides a steam turbine comprising: a high-pressure turbine to which primary steam is supplied; a low-pressure turbine on a final-stage side of the high-pressure turbine and having last-stage turbine rotor blades; a turbine rotor formed as an integral rotor member by which the high-pressure turbine and the low-pressure turbine are coupled; an integral casing within which the high-pressure turbine and the low-pressure turbine are accommodated; a downward-exhaust type of exhaust chamber formed in the casing for exhausting in a downward direction exhaust steam that is expelled from the low-pressure turbine; a high-pressure-side journal bearing for supporting the turbine rotor in a rotatable manner on an initial-stage side of the high-pressure turbine; and a low-pressure-side journal bearing for supporting the turbine rotor in a rotatable manner on a final-stage side of the high-pressure turbine; wherein: the primary steam has a steam pressure of at least 100 kg/cm$^2$ and a steam temperature of at least 500° C.; the steam turbine has a rated power of at least 100 MW; the last-stage turbine rotor blades are rotor blades of an effective blade length of at least 36 inches rotating at 3000 rpm, or are rotor blades of an effective blade length of at least 33.5 inches rotating at 3600 rpm; and the high-pressure turbine is configured in such a manner that at least one stage of a plurality of turbine stages extending from a first high-pressure stage to a last high-pressure stage of the high-pressure turbine is made to be a partial pass-through stage (partial arc-admission stage).

In the above-described second aspect of this invention, the high-pressure turbine is configured in such a manner that at least one stage of a plurality of turbine stages extending from a first high-pressure stage to a last high-pressure stage of the high-pressure turbine is made to be a partial pass-through stage (partial arc-admission stage), making it possible to ensure the bearing stability of the front bearing (the high-pressure-side journal bearing).

Utilizing partial pass-through (a partial arc) in at least one stage of the high-pressure stages from the first high-pressure stage to the last high-pressure stage ensures that the downward steam force on the rotor on the front-bearing side can be increased, which therefore makes it possible for this invention to manifest the effect of providing a compact, high-power, high/low-pressure integrated steam turbine that has good bearing stability.

A third aspect of the present invention provides a steam turbine comprising: a high-pressure turbine to which primary steam is supplied; a low-pressure turbine on a final-stage side of the high-pressure turbine and having last-stage turbine rotor blades; a turbine rotor formed as an integral rotor member by which the high-pressure turbine and the low-pressure turbine are coupled; an integral casing within which the high-pressure turbine and the low-pressure turbine are accommodated; a downward-exhaust type of exhaust chamber formed in the casing for exhausting in a downward direction exhaust steam that is expelled from the low-pressure turbine; a high-pressure-side journal bearing for supporting the turbine rotor in a rotatable manner on an initial-stage side of the high-pressure turbine; and a low-pressure-side journal bearing for supporting the turbine rotor in a rotatable manner on a final-stage side of the high-pressure turbine; wherein: the primary steam has a steam pressure of at least 100 kg/cm$^2$ and a steam temperature of at least 500° C.; the steam turbine has a rated power of at least 100 MW; the last-stage turbine rotor blades are rotor blades of an effective blade length of at least 36 inches rotating at 3000 rpm, or are rotor blades of an effective blade length of at least 33.5 inches rotating at 3600 rpm; and the turbine rotor has a dimension of at least 5700 mm as a bearing span between the high-pressure-side journal bearing and the low-pressure-side journal bearing, and a minimum axial diameter of at least 550 mm.

In the above-described third aspect of this invention, the turbine rotor has a dimension of at least 5700 mm as a bearing span between the high-pressure-side journal bearing and the low-pressure-side journal bearing, and a minimum axial diameter of at least 550 mm, which makes it possible to detune the secondary critical speed with respect to the rated speed (as shown in FIG. 3), suppress any increase in shaft vibration, and also raise the primary critical speed to greater than one-third of the rated speed, thus enabling a high-temperature, high-pressure, high-output, high/low-pressure integrated steam turbine in which deterioration of the turbine start-up characteristics is prevented. Since it is possible in this manner to detune the secondary critical speed and also raise the primary critical speed to greater than one-third of the rated speed, it becomes possible to simultaneously achieve the two requirements of vibration characteristics and start-up characteristics (prevention of any deterioration of the turbine start-up characteristics) that are extremely important in the operation of a steam turbine, and it is therefore possible to implement a high-temperature, high-pressure, high-output, high/low-pressure integrated steam turbine that satisfies both the "high-temperature, high-pressure, high-output conditions" and the "single turbine rotor condition"—an achievement that must be emphasized.

A fourth aspect of the present invention provides a steam turbine comprising: a high-pressure turbine to which primary steam is supplied; a low-pressure turbine on a final-stage side of the high-pressure turbine and having last-stage turbine rotor blades; a turbine rotor formed as an integral rotor member by which the high-pressure turbine and the low-pressure turbine are coupled; an integral casing within which the high-pressure turbine and the low-pressure turbine are accommodated; a downward-exhaust type of exhaust chamber formed in the casing for exhausting in a downward direction exhaust steam that is expelled from the low-pressure turbine; a high-pressure-side journal bearing for supporting the turbine rotor in a rotatable manner on an initial-stage side of the high-pressure turbine; and a low-pressure-side journal bearing for supporting the turbine rotor in a rotatable manner on a final-stage side of the high-pressure turbine; wherein: the primary steam has a steam pressure of at least 100 kg/cm$^2$ and a steam temperature of at least 500° C.; the steam turbine has a rated power of at least 100 MW; the last-stage turbine rotor blades are rotor blades of an effective blade length of at least 36 inches rotating at 3000 rpm, or are rotor blades of an effective blade length of at least 33.5 inches rotating at 3600 rpm; and the vertical cross-sectional shape of an inner wall of a conical portion forming a rear portion of the exhaust chamber is a shape generated by a single circular arc, or a shape generated by a smoothly connected line consisting of at least one straight line segment and at least one circular arc subtending angles of at least 140 degrees, or a shape generated by a smoothly connected line such that a plurality of straight lines mutually subtend angles of at least 140 degrees.

In the above-described fourth aspect of this invention, the vertical cross-sectional shape of the inner wall of the conical portion forming the rear portion of the exhaust chamber is a shape generated by a single circular arc, or a shape generated by a smoothly connected line consisting of at least one straight line segment and at least one circular arc subtending angles of at least 140 degrees, or a shape generated by a smoothly connected line such that a plurality of straight lines mutually subtend angles of at least 140 degrees, which makes it possible to devise a countermeasure that shortens the bearing span, increasing the stiffness of the shaft assembly, detuning the critical speeds, and ensuring the stability of the shaft assembly. In other words, making the exhaust chamber conical portion into a curved-surface exhaust chamber formed as a curved surface or an approximately curved-surface exhaust chamber that approximates to a curved surface provides a high/low-pressure integrated steam turbine in which the exhaust flow is smoothed to prevent any increase in exhaust losses, the axial-direction distance of the exhaust chamber is shortened but the exhaust efficiency is still ensured, and the bearing span is also shortened accordingly.

That is to say, it has been difficult in the past to implement a high-temperature, high-pressure, high-output, high/low-pressure integrated steam turbine that satisfies both the "high-temperature, high-pressure, high-output conditions" and the "single turbine rotor condition" if the conical portion of the exhaust chamber is an unmodified linear circular cone, as in the prior art, because such a configuration increases the axial length L of the exhaust chamber and consequently lengthens the bearing span of the turbine, so the stiffness of the turbine shaft falls, the eigenvalue of the turbine shaft assembly drop, and large amounts of vibration are likely to occur. However, these problem points are solved by the application of the curved-surface exhaust chamber proposed by the present invention, making it possible to provide a compact high/low-pressure integrated steam turbine that operates superbly at higher temperatures, pressures, and power outputs, without any deterioration in the exhaust efficiency and without any large amount of shaft vibration with the necessary stiffness of the shaft assembly ensured.

If the shape of the conical portion of the exhaust chamber is an unmodified circular cone, as in the prior art, the exhaust flow strikes the downstream-side wall of the exhaust chamber in a state close to perpendicular thereto, which increases the exhaust losses and worsens the turbine performance. That is why it has been necessary to increase the distance in the axial direction of the exhaust chamber when using an unmodified circular conical shape in the exhaust chamber but wishing to ensure the necessary exhaust efficiency, to make sure that the exhaust flow is slowed sufficiently before it strikes the downstream-side wall of the exhaust chamber. In contrast thereto, the curved-surface exhaust chamber proposed by the present invention enables a huge reduction in the axial length of the exhaust chamber while maintaining the same level of exhaust efficiency as that of an exhaust chamber of the prior art that has a longer axial length with a circular conical portion.

This aspect of the invention has the effect of enabling the provision of a compact high/low-pressure integrated steam turbine that operates superbly at higher temperatures, pressures, and power outputs, without any deterioration in the exhaust efficiency and without causing any drop in the critical speeds with the necessary stiffness of the shaft assembly ensured, and also without large amounts of shaft vibration during normal operation at which detuning is ensured.

A fifth aspect of the present invention provides a steam turbine comprising: a high-pressure turbine to which primary steam is supplied; a low-pressure turbine on a final-stage side of the high-pressure turbine and having last-stage turbine rotor blades; a turbine rotor formed as an integral rotor member by which the high-pressure turbine and the low-pressure turbine are coupled; an integral casing within which the high-pressure turbine and the low-pressure turbine are accommodated; a downward-exhaust type of exhaust chamber formed in the casing for exhausting in a downward direction exhaust steam that is expelled from the low-pressure turbine; a high-pressure-side journal bearing for supporting the turbine rotor in a rotatable manner on an initial-stage side of the high-pressure turbine; and a low-pressure-side journal bearing for supporting the turbine rotor in a rotatable manner on a final-stage side of the high-pressure turbine; wherein: the primary steam has a steam pressure of at least 100 kg/cm$^2$ and a steam temperature of at least 500° C.; the steam turbine has a rated power of at least 100 MW; the last-stage turbine rotor blades are rotor blades of an effective blade length of at least 36 inches rotating at 3000 rpm, or are rotor blades of an effective blade length of at least 33.5 inches rotating at 3600 rpm; the vertical cross-sectional shape of an inner wall of a conical portion forming a rear portion of the exhaust chamber is a shape generated by a single circular arc, or a shape generated by a smoothly connected line consisting of at least one straight line segment and at least one circular arc subtending angles of at least 140 degrees, or a shape generated by a smoothly connected line such that a plurality of straight lines mutually subtend angles of at least 140 degrees; and the ratio L/D of the axial length L between a central position of the last-stage turbine rotor blades and a rearmost portion of the conical portion to the blade-tip diameter D of the last-stage turbine rotor blades is within the range of 0.32 to 0.48.

In the above-described fifth aspect of this invention, the vertical cross-sectional shape of the inner wall of the conical portion forming the rear portion of the exhaust chamber is a shape generated by a single circular arc, or a shape generated by a smoothly connected line consisting of at least one straight line segment and at least one circular arc subtending angles of at least 140 degrees, or a shape generated by a smoothly connected line such that a plurality of straight lines mutually subtend angles of at least 140 degrees; and the ratio L/D of the axial length L between a central position of the last-stage turbine rotor blades and a rearmost portion of the conical portion to the blade-tip diameter D of the last-stage turbine rotor blades is within the range of 0.32 to 0.48, making it possible to devise a countermeasure that shortens the bearing span, increasing the stiffness of the shaft assembly and thus detune the critical speeds, and suppressing any increase in shaft vibration. In other words, making the exhaust chamber conical portion into a curved-surface exhaust chamber formed as a curved surface or an approximately curved-surface exhaust chamber that approximates to a curved surface, and also restricting L/D to the range of 0.32 to 0.48, prevents any increase in exhaust losses by smoothing the exhaust flow, shortens the axial-direction distance of the exhaust chamber while ensuring an exhaust efficiency that is at least equal to the favorable exhaust efficiency of a prior-art model having an exhaust chamber cone portion that is a circular cone and wherein L/D is 0.5 or greater, ensures detuning of the secondary critical speed by enabling a high/low-pressure integrated steam turbine of a configuration in which the bearing span is shortened accordingly, and suppresses any increase in shaft vibration.

A sixth aspect of the present invention provides a steam turbine comprising: a high-pressure turbine to which primary steam is supplied; a low-pressure turbine on a final-stage side of the high-pressure turbine and having last-stage turbine rotor blades; a turbine rotor formed as an integral rotor member by which the high-pressure turbine and the low-pressure turbine are coupled; an integral casing within which the high-pressure turbine and the low-pressure turbine are accommodated; a downward-exhaust type of exhaust chamber formed in the casing for exhausting in a downward direction exhaust steam that is expelled from the low-pressure turbine; a high-pressure-side journal bearing for supporting the turbine rotor in a rotatable manner on an initial-stage side of the high-pressure turbine; and a low-pressure-side journal bearing for supporting the turbine rotor in a rotatable manner on a final-stage side of the high-pressure turbine; wherein: the primary steam has a steam pressure of at least 100 kg/cm$^2$ and a steam temperature of at least 500° C.; the steam turbine has a rated power of at least 100 MW; the last-stage turbine rotor blades are rotor blades of an effective blade length of at least 36 inches rotating at 3000 rpm, or are rotor blades of an effective blade length of at least 33.5 inches rotating at 3600 rpm; the vertical cross-sectional shape of an inner wall of a conical portion forming a rear portion of the exhaust chamber is a shape generated by a single circular arc, or a shape generated by a smoothly connected line consisting of at least one straight line segment and at least one circular arc subtending angles of at least 140 degrees; and at least one circular arc forming the vertical cross-sectional shape of the inner wall of the conical portion has a radius of curvature within the range of 0.9 times to 1.8 times the blade length of the last-stage turbine rotor blades, or it has a central angle β of at least 45 degrees.

In the above-described sixth aspect of this invention, the vertical cross-sectional shape of the inner wall of the conical portion forming a rear portion of the exhaust chamber is a shape generated by a single circular arc, or a shape generated by a smoothly connected line consisting of at least one straight line segment and at least one circular arc subtending angles of at least 140 degrees, and at least one circular arc forming the vertical cross-sectional shape of the inner wall of the conical portion has a radius of curvature within the range of 0.9 times to 1.8 times the blade length of the last-stage turbine rotor blades, or it has a central angle β of at least 45 degrees, making it possible to increase the stiffness of the shaft assembly and thus detune the critical speeds, thereby ensuring the stability of the shaft assembly, by devising a countermeasure that shortens the bearing span. That is to say, in a high-temperature, high-pressure, high-output, high/low-pressure integrated steam turbine that satisfies both the "high-temperature, high-pressure, high-output conditions" and the "single turbine rotor condition," the exhaust chamber is configured in such a manner that the exhaust chamber conical portion is a curved surface or an approximation to a curved surface and the radius of curvature R of a curved-surface cone of the exhaust chamber is set to within the range of 0.9 times to 1.8 times the blade length LB of the last-stage turbine rotor blades (LSB), or the curved surface covers a range extending over at least 45 degrees that is the angle at the vertical cross-sectional surface of the exhaust chamber conical portion. This allows the exhaust flow to exit smoothly and thus prevent any loss of exhaust efficiency, enables a shortening of the axial-direction distance of the exhaust chamber by ensuring an exhaust efficiency that is at least equal to the favorable exhaust efficiency of a prior-art exhaust chamber having a cone portion that has a linear circular-cone shape and wherein L/D is 0.5 or greater, and, as a result, makes it possible to implement a high/low-pressure integrated steam turbine wherein the bearing span is shortened, the secondary critical speed is sufficiently detuned, and axial vibration is suppressed to a low level.

In any of the fourth to sixth aspects of this invention, a bearing that is either the high-pressure-side journal bearing or the low-pressure-side journal bearing could be disposed in a foundation portion on which at least one portion of the casing is provided, and the other bearing could be disposed at a distance from a foundation portion (a seventh aspect of this invention).

In any of the first, third, fourth, fifth, sixth and seventh aspects of the present invention, the high-pressure turbine could be configured in such a manner that at least one stage of a plurality of turbine stages extending from a first high-pressure stage to a last high-pressure stage of the high-pressure turbine is made to be a partial pass-through stage (partial arc-admission stage).

BRIEF DESCRIPTION OF DRAWINGS

FIG. 12 is a cross-sectional view of a high-temperature, high-pressure, high-output, high/low-pressure integrated steam turbine provided with the "high-temperature, high-pressure, high-output conditions" and the "single turbine rotor condition;"

FIG. 15 is a view illustrating results relating to the second embodiment of the steam turbine of this invention;

FIG. 17 is a cross-sectional view of a prior-art exhaust chamber wherein the exhaust chamber conical portion has a circular-cone shape and L/D is 0.5 or greater;

FIG. 19 is a view illustrating results relating to the fifth embodiment of the steam turbine of this invention.

BEST MODE FOR CARRYING OUT THE INVENTION

Embodiments of the present invention will be described below, with reference to the accompanying drawings. Identical components are given the same reference numbers and duplicate descriptions thereof are omitted.

Figure 1:
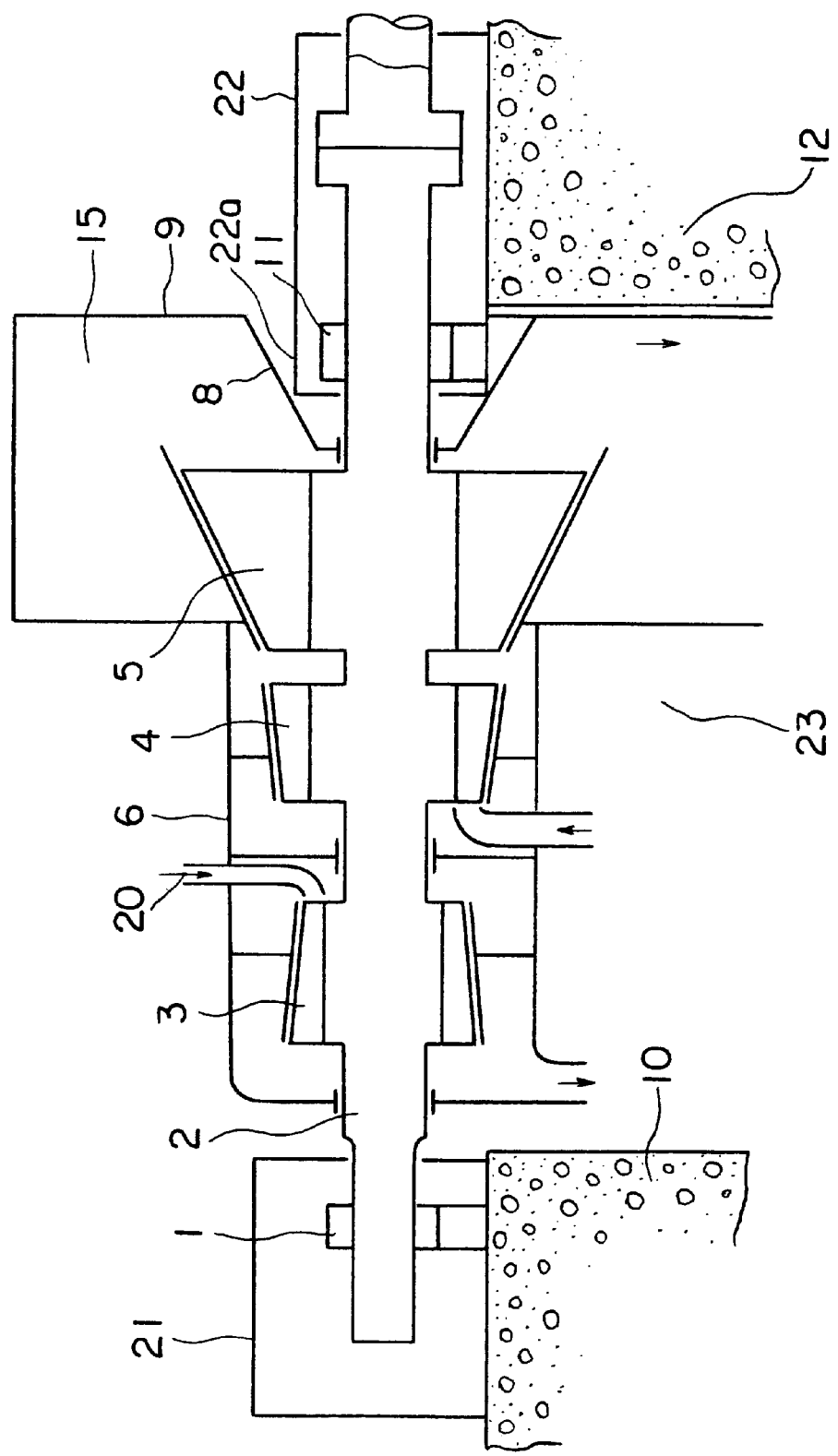
FIG. 1 is a cross-sectional view of a first embodiment of the steam turbine in accordance with this invention.

The description now turns to a first embodiment of this invention, shown in FIG. 1. This embodiment corresponds to the previous sections on Technical Problem (1) and the first aspect of this invention.

The steam turbine shown in FIG. 1 has a rated power of at least 100 MW, and a high-pressure turbine 3, a low-pressure turbine 5 on a final-stage side of the high-pressure turbine 3, and an intermediate-pressure turbine 4 disposed between the high-pressure turbine 3 and the intermediate-pressure turbine 4 are linked to a turbine rotor 2. Primary steam (main steam) 20 is supplied to the high-pressure turbine 3. The primary steam 20 has a steam pressure of at least 100 kg/cm$^2$ and a steam temperature of at least 500° C.

The low-pressure turbine 5 has last-stage turbine rotor blades in a final stage thereof. The last-stage turbine rotor blades are rotor blades of an effective blade length of at least 36 inches rotating at 3000 rpm, or are rotor blades of an effective blade length of at least 33.5 inches rotating at 3600 rpm.

The high-pressure turbine 3, the intermediate-pressure turbine 4, and the low-pressure turbine 5 are accommodated within an integral casing 6.

A downward-exhaust type of exhaust chamber 15, for exhausting in a downward direction exhaust steam that is expelled from the low-pressure turbine 5, is formed within the low-pressure turbine 5 part of the casing 6. An exhaust chamber conical portion 8 is formed in a central rear portion of the exhaust chamber 15. A back portion of the exhaust chamber 15 is configured of an exhaust chamber downstream-side wall 9.

The turbine rotor 2 is supported by a high-pressure-side journal bearing 1 supported rotatably at an initial-stage side of the high-pressure turbine 3 and a low-pressure-side journal bearing 11 supported rotatably at a final-stage side of the low-pressure turbine 5. The high-pressure-side journal bearing 1 is accommodated within a high-pressure bearing housing 21. The low-pressure-side journal bearing 11 is accommodated within a low-pressure bearing housing 22.

The high-pressure-side journal bearing 1 is disposed together with the high-pressure bearing housing 21 on a foundation portion 10.

The low-pressure bearing housing 22 is disposed on another foundation portion 12. In this case, the foundation portion 10 and the foundation portion 12 are portions to which the steam turbine and other components such as a generator (not shown in the figure) are attached, and the foundation portion 10 and the foundation portion 12 are constructed integrally. A concave space 23 is formed between the foundation portion 10 and the foundation portion 12, and components such as the casing 6 and the exhaust chamber 15 are disposed in this concave space 23.

Figure 4:
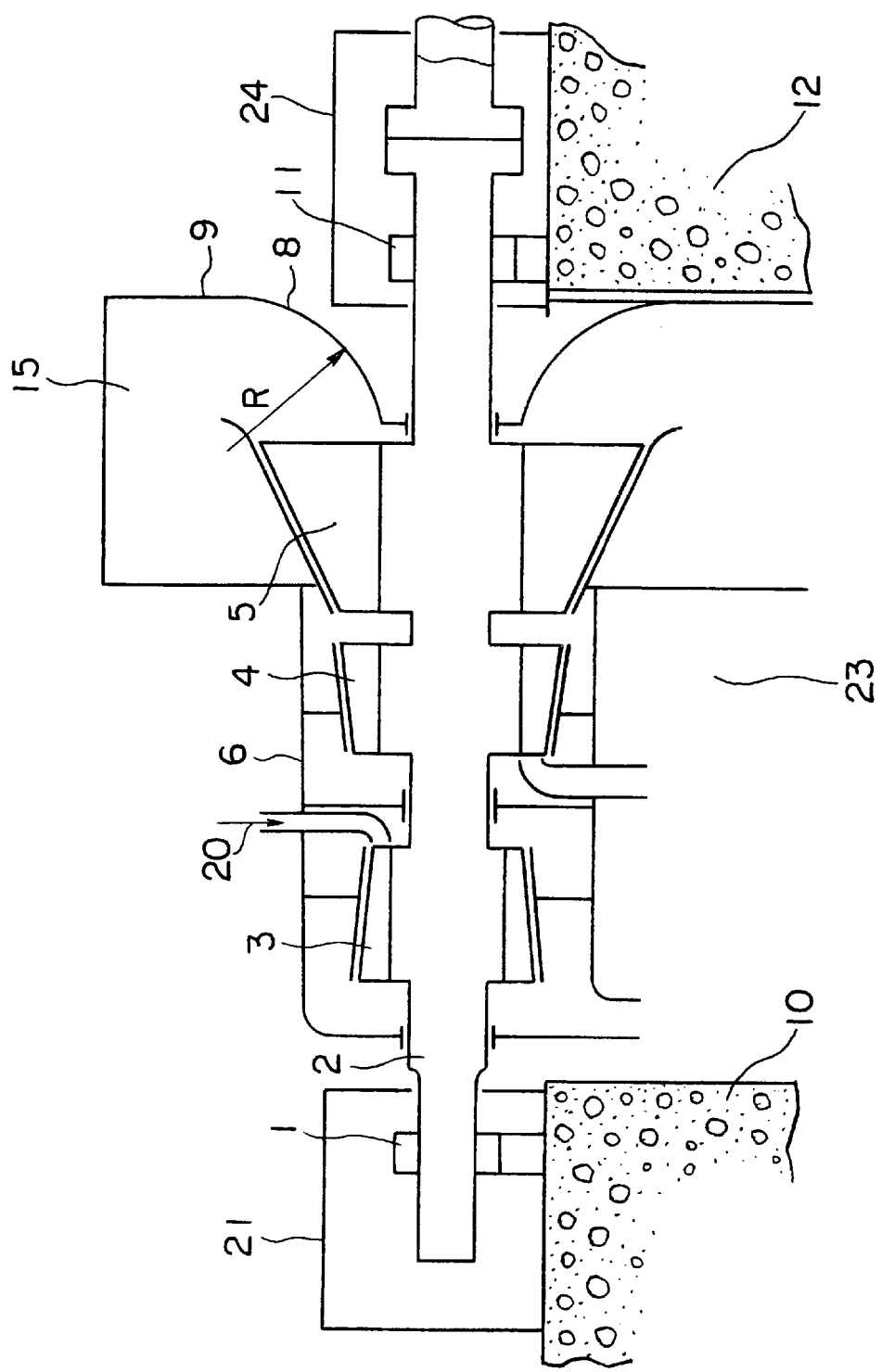
FIG. 4 is a cross-sectional view of an example of a fourth embodiment of the steam turbine of this invention.

The low-pressure bearing housing 22 disposed above the foundation portion 12 differs from a low-pressure bearing housing 24 shown in FIGS. 4 and 12 and has a portion 22a that is offset towards the high-pressure-side journal bearing 1 side of the foundation portion 12. This portion 22a of the low-pressure bearing housing 22 is in contact with the outer wall of a lower portion of the exhaust chamber conical portion 8.

As shown in FIG. 1, the low-pressure-side journal bearing 11 is attached on top of a base portion within the portion 22a of the low-pressure bearing housing 22, so that the low-pressure-side journal bearing 11 is disposed at a position that is offset towards the high-pressure-side journal bearing 1 from the foundation portion 12. This makes it possible to shorten the bearing span which is the distance between the high-pressure-side journal bearing 1 and the low-pressure-side journal bearing 11.

The above described embodiment makes it possible to shorten the distance between the high-pressure-side journal bearing 1 and the low-pressure-side journal bearing 11 (the bearing span). This ensures the stiffness of the shaft assembly of the turbine and prevents any drop in the eigenvalue of the shaft assembly, thus maintaining the vibration characteristics of the shaft favorably, making it possible to prevent the secondary critical speed from approaching the rated speed so that detuning is insufficient, or even matching the rated speed. This in turn makes it possible to provide a compact high/low-pressure integrated steam turbine that can be adapted for higher temperatures, pressures, and power outputs with little shaft vibration and favorable operating characteristics, without leading to an increase in the rotor diameter which would cause efficiency deterioration. It is therefore possible to implement a high-temperature, high-pressure, high-output, high/low-pressure integrated steam turbine that satisfies both of the above-described "high-temperature, high-pressure, high-output conditions" and the "single turbine rotor condition."

A second embodiment of this invention will now be described with reference to FIG. 2. This embodiment corresponds to the previous sections on Technical Problem (2) and the second aspect of this invention.

The high/low-pressure integrated steam turbine of this embodiment is shown in FIG. 12. In this embodiment of the invention, the high-pressure turbine 3 is configured in such a manner that at least one stage of a plurality of turbine stages extending from a first high-pressure stage to a last high-pressure stage of the high-pressure turbine 3 is made to be a partial pass-through stage (partial arc-admission stage) (such as that shown by reference number 36 in FIG. 2, by way of example). In this case, a partial pass-through stage (partial arc-admission stage) is defined as a turbine stage configured such that steam passes through only a region of a partial pass-through angle (partial arc) that is a part of the annular blade train that forms the static blades disposed annularly in this stage, and flows into the rotor blades, and steam is prevented from passing through the remaining region of the static blades, as shown in FIG. 2

Figure 14:
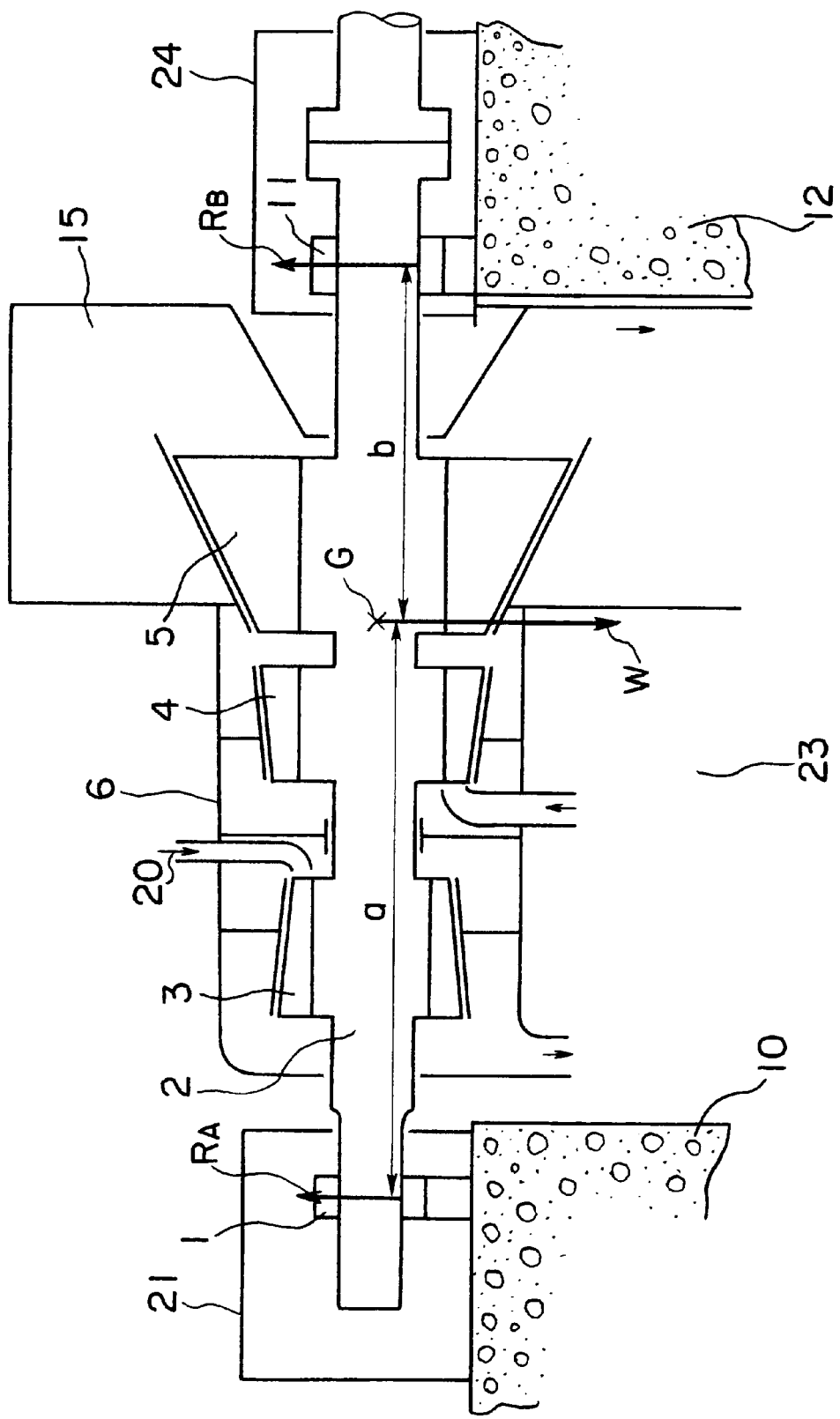
FIG. 14 is a view illustrating a technical problem relating to the second embodiment of the steam turbine in accordance with this invention.

As shown in FIG. 14, the weight W of the high/low-pressure integrated steam turbine is supported by the front bearing (the high-pressure-side journal bearing 1) and the rear bearing (the low-pressure-side journal bearing 11), so that the load is divided into a front-bearing load FA and a rear-bearing load FB. The rotor is subjected to reactive forces from the bearings of the same magnitude; i.e., a front-bearing reactive force RA and a rear-bearing reactive force RB. The position of the center of gravity of the rotor is denoted by G. In addition, a denotes the length from the center of gravity G to the high-pressure-side journal bearing 1 (the forward length) and b denotes the length from the center of gravity G to the low-pressure-side journal bearing 11 (rearward length).

Partial pass-through is set so that a downward steam force acts on the rotor. More specifically, when the rotation of the rotor is in the clockwise direction as seen from the steam outlet side of a turbine stage, as shown in FIG. 2, the setting is such as to comprise the region in the vicinity of the 3 o'clock position or such that the steam pass-through ratio of the region from the noon position to the 6 o'clock position is greater than the steam pass-through ratio of the region from the 6 o'clock position to the 12 o'clock position. If the rotation of the rotor is counterclockwise, the setting is such as to comprise the region in the vicinity of the 9 o'clock position or such that the steam pass-through ratio of the region from the 6 o'clock position to the 12 o'clock position is greater than the steam pass-through ratio of the region from the noon position to the 6 o'clock position.

Figure 2:
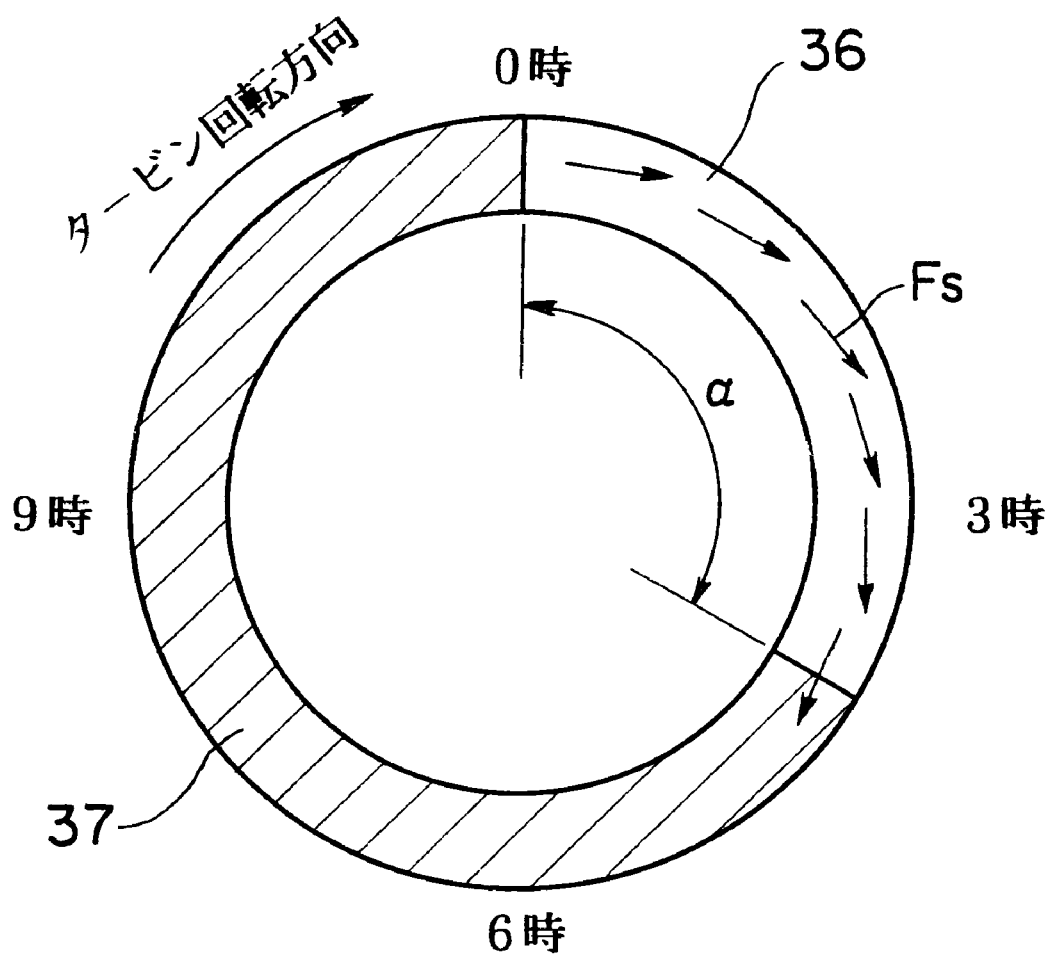
FIG. 2 is a illustrative view of a second embodiment of the steam turbine of this invention.

If $\alpha$ is the partial pass-through angle (partial arc) for steam, as shown in FIG. 2, the configuration of the turbine stages in a further embodiment of this invention could be such that the partial pass-through ratio (partial arc ratio) $\alpha/360$ increases for downstream stages.

The relationship between forward length a and load F is shown in FIG. 15. FA denotes the front-bearing load, FB denotes the rear-bearing load, the solid lines show the steam loading state due to partial pass-through, the broken lines show the steam loading state due to total pass-through, $\Delta$ FA shows the incremental front-bearing load due to partial pass-through, and $\Delta$ FB shows the incremental rear-bearing load due to partial pass-through.

Utilizing partial pass-through (a partial arc) in at least one stage of the high-pressure stages from the first high-pressure stage to the last high-pressure stage ensures that the downward steam force on the rotor on the front-bearing side (the high-pressure-side journal bearing 1 side) can be increased as shown in FIG. 15, which therefore makes it possible to provide a compact, high-power, high/low-pressure integrated steam turbine that has good bearing stability.

In addition, utilizing partial pass-through (a partial arc) in at least one stage of the high-pressure stages from the first high-pressure stage to the last high-pressure stage also makes it possible to achieve the effects described below.

Figure 16:
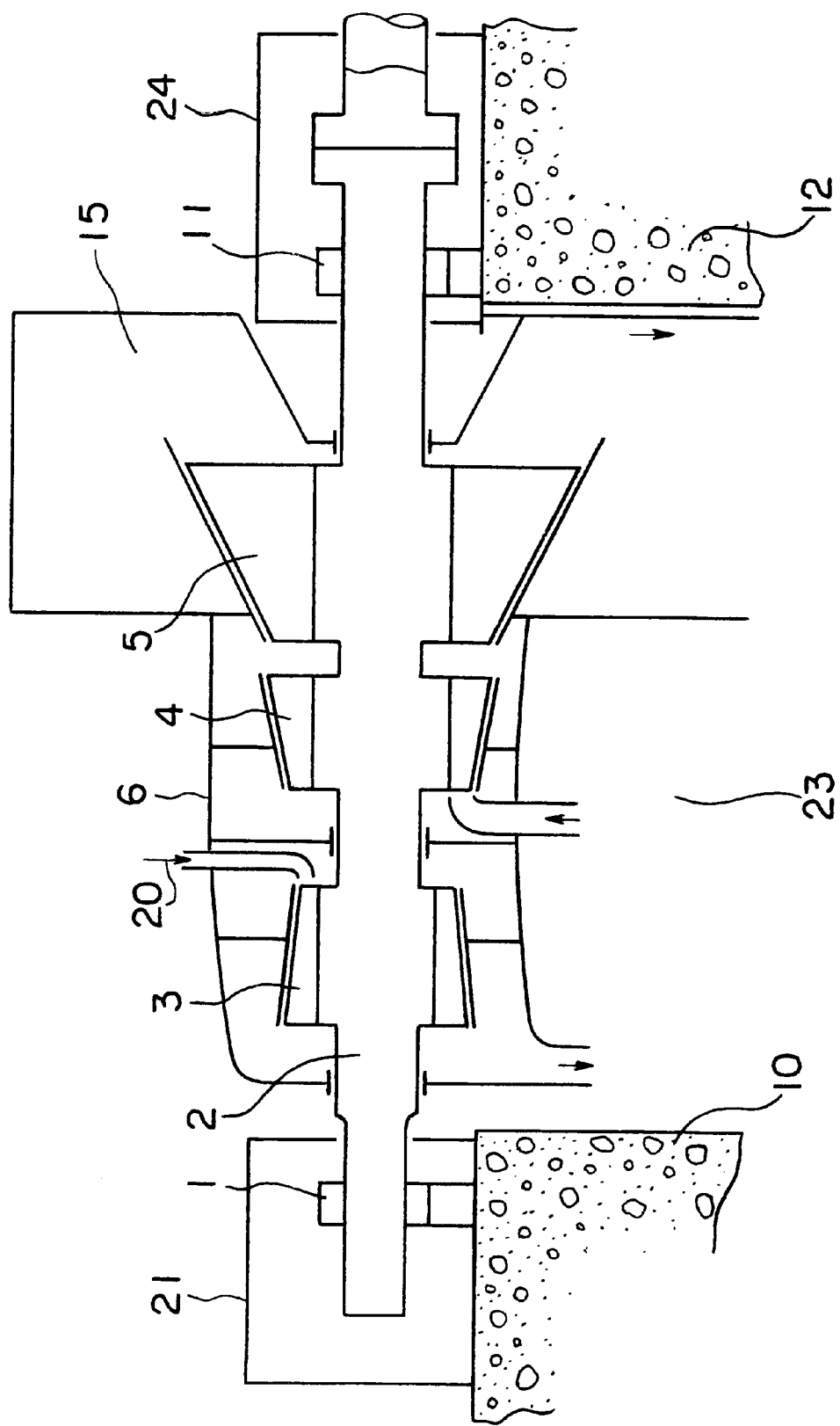
FIG. 16 is a view illustrating another technical problem relating to the second embodiment of the steam turbine of this invention, showing an example in which the upper half of the casing has thermally deformed into a convex shape, to create "cat's-back" deformation.

When the turbine is operating under an extremely low load, such as at start-up, the temperature of the upper half of the casing is generally higher than that of the lower half of the casing, and thus the thermal expansion of the upper half is greater than that of the lower half, so that a form of thermal deformation known as "cat's-back" deformation causes the upper side of the casing 6 to become convex, as shown in FIG. 16. If this thermal deformation is too large and the setting of the radial clearance between the rotating portions and the static portions is too small, the rotor blades or the rotor, which are the rotating portions, will come into contact with the static portions, which will give rise to a large amount of shaft vibration and may result in the phenomenon known as "rubbing." To reduce the likelihood of this rubbing occurring, it is usual to pay consideration to design factors, such as setting a minimum value for the clearance between the rotating portions and the static portions, even if this results in a small sacrifice of efficiency. It should be noted that, with partial pass-through (partial arc) turbine stages which are designed to generate a downward steam force, the flowrate of steam flowing through the lower portions of the turbine is greater than that of the steam flowing through the upper portions thereof. Thus, since the steam flows faster through the lower portions, the thermal transfer ratio of the inner surfaces of the lower half of the casing is greater than that of the upper half, and as a result the thermal flowrate to the metal of the lower half of the casing is greater so that the temperature of the lower half of the casing rises faster. Since this phenomenon tends to suppress "cat's-back" deformation of the casing, the previously described configuration that utilizes partial pass-through (partial arc) in the high-pressure stages, where the temperature is high, can be expected to be very effective in making it possible to suppress "cat's-back" deformation of the casing that occurs when the turbine is operating under an extremely low load, such as at start-up, which in turn can make a large contribution to improving the integrity, efficiency, and operability of the steam turbine.

A third embodiment of this invention will now be described with reference to FIG. 3. This embodiment corresponds to the previous sections on Technical Problem (3) and the third aspect of this invention.

In this embodiment, the turbine rotor 2 has a dimension of at least 5700 mm as the bearing span between the high-pressure-side journal bearing 1 and the low-pressure-side journal bearing 11 and a minimum shaft diameter of at least 550 mm.

Figure 3:
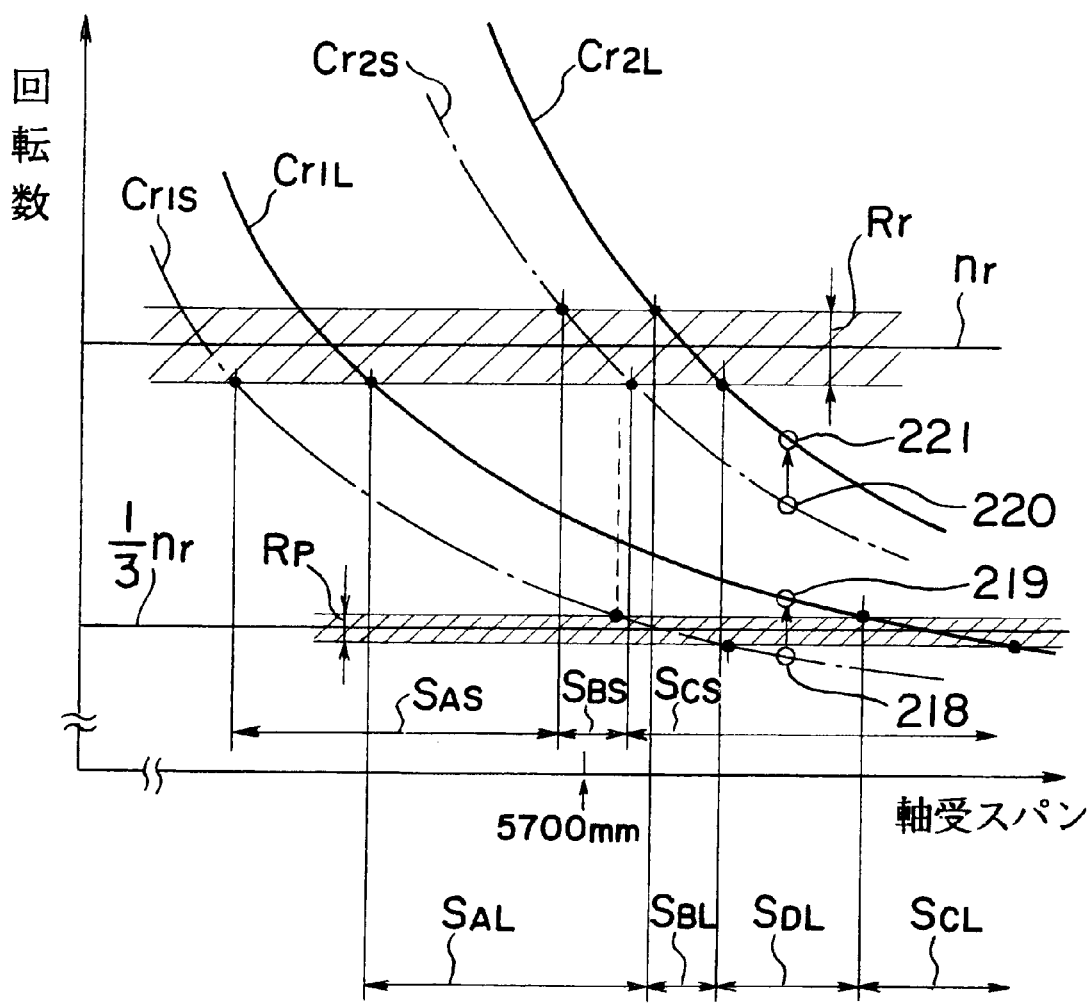
FIG. 3 is a graph illustrating a third embodiment of the steam turbine of this invention.

In FIG. 3, nr denotes the rated speed, Rr denotes the rated speed detuning region (tuning zone for avoiding a coincidence with an eigenvalue), Rp denotes the purge speed detuning region when the purge speed is set to nr/3, Cr1S denotes the primary critical speed of a small-diameter rotor (a prior-art rotor having a central shaft diameter of less than 550 mm, hereinafter the same), Cr2S denotes the secondary critical speed of a small-diameter rotor, SAS denotes region wherein the bearing span can be set for a small-diameter rotor, SBS denotes the region wherein the bearing span cannot be set for a small-diameter rotor, SCS denotes the region wherein bearing span setting is possible for a small-diameter rotor but the purge speed must be set to less than nr/3 (leading to operation deterioration), SAL denotes region wherein the bearing span can be set for a large-diameter rotor (a rotor in accordance with this invention having a central shaft diameter of at least 550 mm, hereinafter the same), SBL denotes the region wherein the bearing span cannot be set for a large-diameter rotor, SCL denotes the region wherein bearing span setting is possible for a small-diameter rotor but the purge speed must be set to less than nr/3 (leading to operation deterioration), and SDL denotes another region wherein the bearing span can be set for a large-diameter rotor. The suffix S denotes a prior-art rotor having a central shaft diameter of less than 550 mm, for example, and the suffix L denotes the rotor of this invention having a central shaft diameter of at least 550 mm, for example. In addition, reference number 218 denotes a primary critical speed setting example for the small-diameter rotor of the prior-art method, reference number 219 denotes a primary critical speed setting example for the large-diameter rotor of this invention, reference number 220 denotes a secondary critical speed setting example for the small-diameter rotor of the prior-art method, and reference number 221 denotes a secondary critical speed setting example for the large-diameter rotor of this invention.

When the minimum shaft diameter of the central portion of the rotor shaft of the high/low-pressure integrated steam turbine was set to approximately 500 mm, which is the same as that in practice in the prior art, setting the bearing span to at least 5700 mm makes it possible to detune the secondary critical speed to below the rated speed. However, when it is usual to set the primary critical speed to one-third of the rated speed, there is a danger that it will approach or even match the purge speed, as described previously, which is a technical concern in that it is assumed that lowering the purge speed to avoid this problem will inevitably cause other problems, leading to a huge deterioration in the turbine start-up characteristics.

In contrast thereto, the configuration suggested in FIG. 3 wherein the bearing span of the high/low-pressure integrated steam turbine is set to at least 5700 mm and also the minimum shaft diameter of the central portion of the rotor shaft is thickened to at least 550 mm makes it possible to maintain detuning of the secondary critical speed with respect to the rated speed and thus suppress any increase in shaft vibration, and also makes it possible to implement a high-temperature, high-pressure, high-output, high/low-pressure integrated steam turbine wherein the primary critical speed can be raised to more than one-third of the rated speed and deterioration of the turbine start-up characteristics is prevented.

Since the configuration in this embodiment of the invention is such that the bearing span of the high/low-pressure integrated steam turbine is set to at least 5700 mm and also the minimum shaft diameter of the central portion of the rotor shaft is thickened to at least 550 mm, detuning of the secondary critical speed with respect to the rated speed can be guaranteed and any increase in the shaft vibration can be suppressed, and also the primary critical speed can be set to be higher than one-third of the rated speed, as shown in FIG. 3, which makes it possible to implement the huge effect of preventing deterioration of the turbine start-up characteristics. Since it is possible in this manner to detune the secondary critical speed and also raise the primary critical speed to greater than one-third of the rated speed, it becomes possible to simultaneously achieve the two requirements of vibration characteristics and start-up characteristics (prevention of any deterioration of the turbine start-up characteristics) that are extremely important in the operation of a steam turbine, and it is therefore possible to implement a high-temperature, high-pressure, high-output, high/low-pressure integrated steam turbine that satisfies both the "high-temperature, high-pressure, high-output conditions" and the "single turbine rotor condition"—an achievement that must be emphasized.

A fourth embodiment of this invention will now be described with reference to FIGS. 4 to 6. This embodiment corresponds to the previous sections on Technical Problem (4) and the fourth aspect of this invention.

Figure 5:
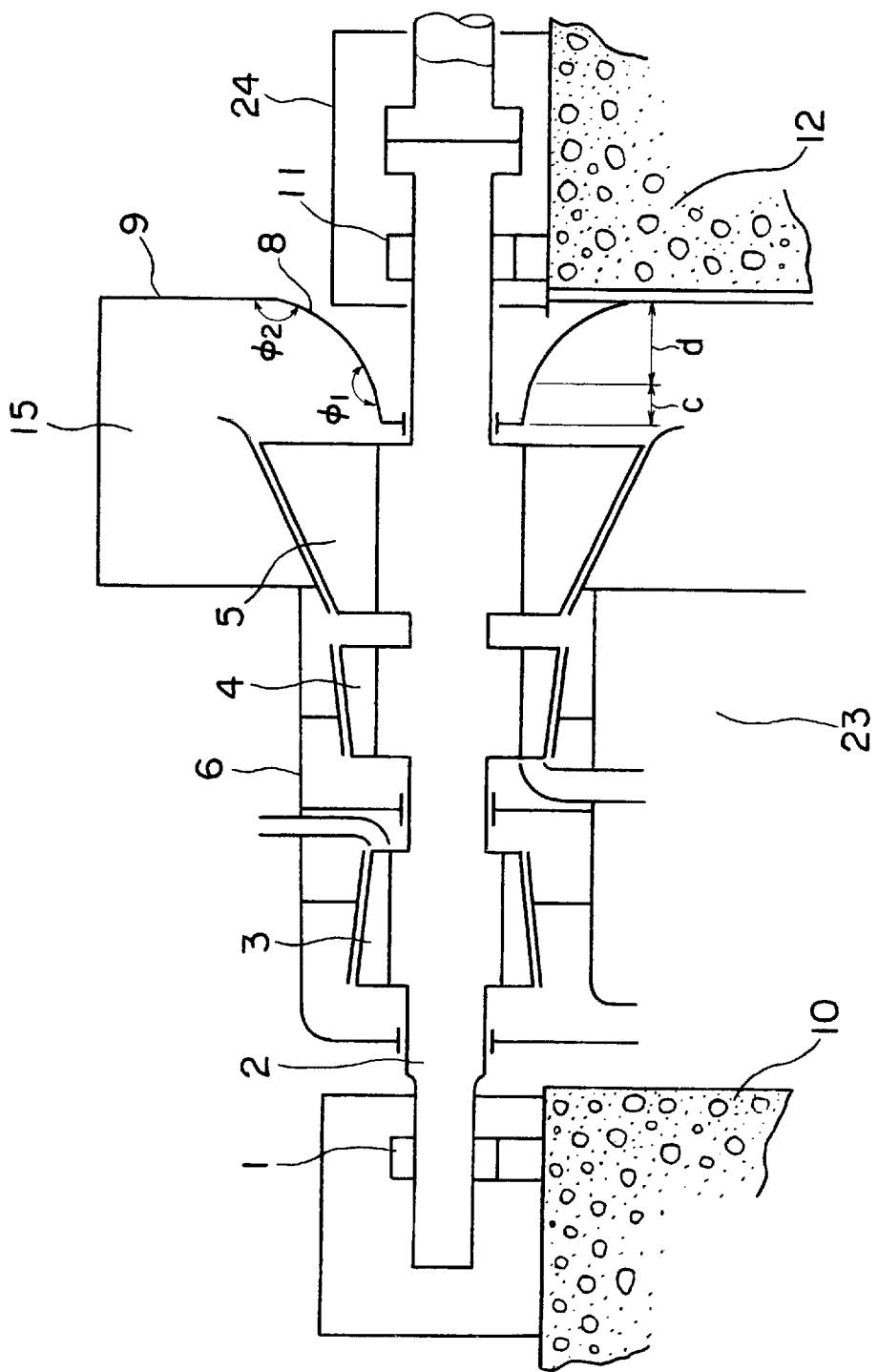
FIG. 5 is a cross-sectional view of another example of the fourth embodiment of the steam turbine of this invention.
Figure 6:
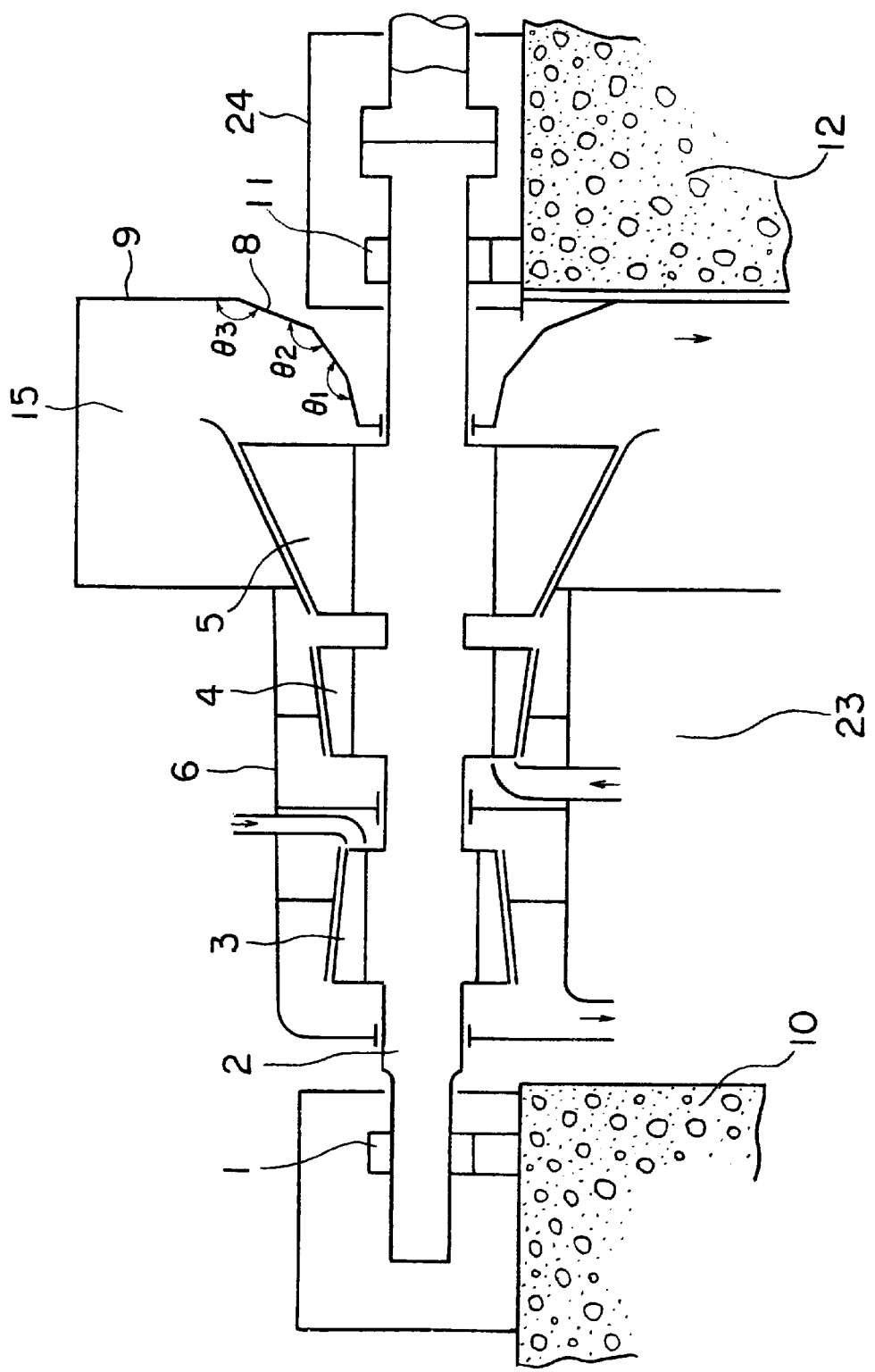
FIG. 6 is a cross-sectional view of a further example of the fourth embodiment of the steam turbine of this invention.

In this embodiment, the vertical cross-sectional shape of the inner wall of the conical portion 8 forming the rear of the exhaust chamber 15 can be generated by any one of: a single circular arc, as shown in FIG. 4; or a smoothly connected shape consisting of at least one straight line segment and at least one circular arc connected by angles $\phi_i$ (where $_i=1, 2, 3 \ldots$) of at least 140 degrees, as shown in FIG. 5; or a linkage of adjacent straight line segments subtending angles of $\theta_i$ (where $_i=1, 2, 3 \ldots$) of at least 140 degrees, as shown in FIG. 6. In this case, if the angles $\phi_i$ or $\theta_i$ subtended by adjacent surfaces of the inner-wall cone of the exhaust chamber are too small, separation will occur in the flow at these angular portions, which will increase the exhaust losses. Therefore, $\phi_i$ and $\theta_i$ are set to at least 140 degrees to ensure that losses due to separation are small. Note that c in FIG. 5 denotes the length of a linear segment and d denotes the length of a curved segment.

If the shape of the conical portion of the exhaust chamber is an unmodified circular cone, as in the prior art, the exhaust flow strikes the downstream-side wall of the exhaust chamber in a state close to perpendicular thereto, which increases the exhaust losses and worsens the turbine performance. That is why it has been necessary to increase the distance in the axial direction of the exhaust chamber when using an unmodified circular conical shape in the exhaust chamber but wishing to ensure the necessary exhaust efficiency, to make sure that the exhaust flow is slowed sufficiently before it strikes the downstream-side wall of the exhaust chamber.

In contrast, this embodiment of the invention enables a huge reduction in the axial length of the exhaust chamber while maintaining the same level of exhaust efficiency as that of an exhaust chamber of the prior art that has a longer axial length with a circular cone-shaped rear wall. Making the exhaust chamber conical portion 8 a curved surface or an approximation to a curved surface ensures that the exhaust flow is smoothed and the axial distance is shortened, thus shortening the bearing span of the turbine, so that it is possible to provide a compact high/low-pressure integrated steam turbine that operates superbly at higher temperatures, pressures, and power outputs, without any deterioration in the exhaust efficiency and without causing any drop in the critical speeds with the necessary stiffness of the shaft assembly ensured, and also without large amounts of shaft vibration during normal operation at which detuning is ensured.

A fifth embodiment of this invention will now be described with reference to FIG. 8. This embodiment corresponds to the previous sections on Technical Problem (5) and the fifth aspect of this invention.

Figure 8:
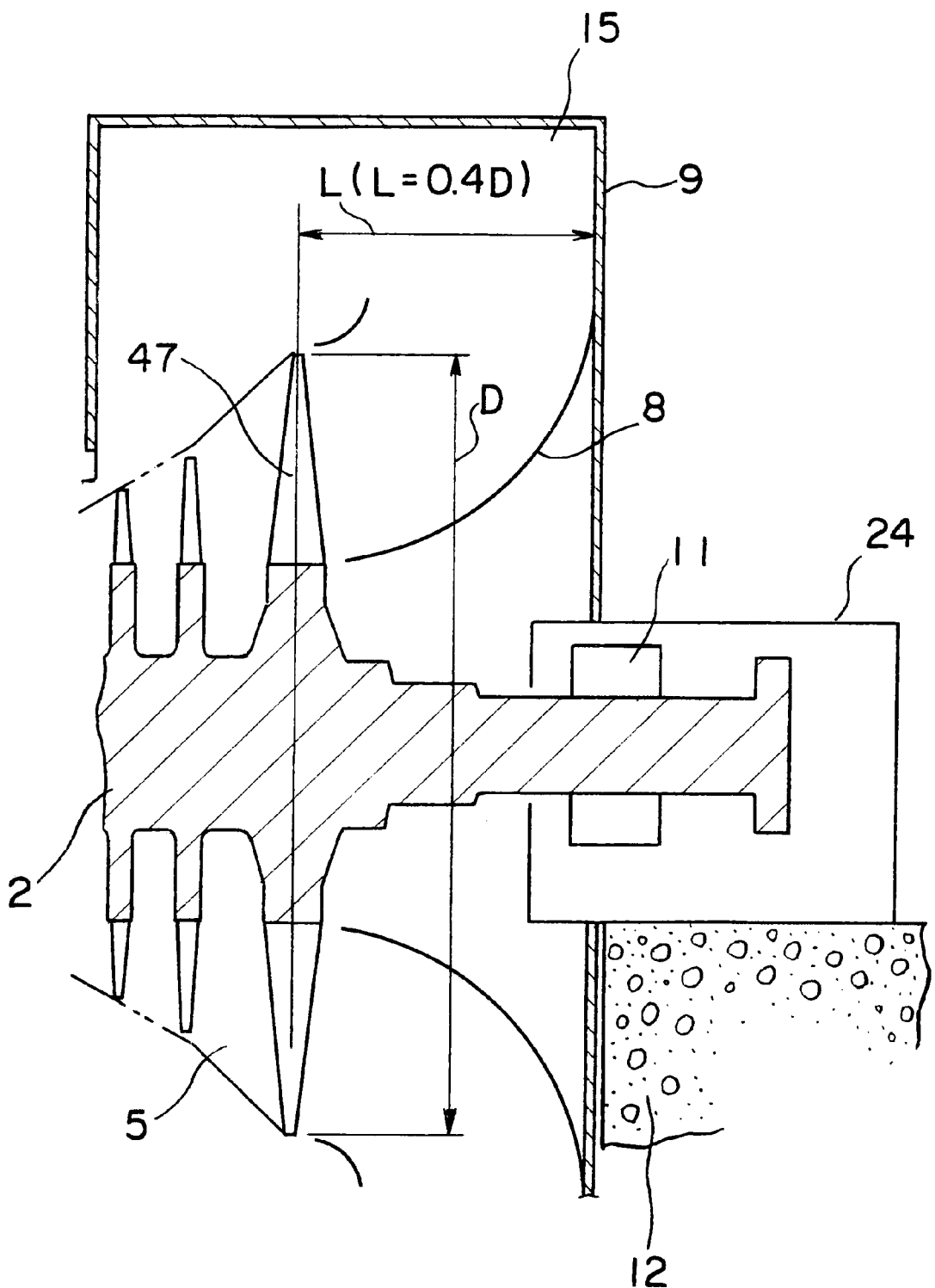
FIG. 8 is a cross-sectional view of an example of a fifth embodiment of the steam turbine of this invention.

This embodiment is based on the characteristic feature of the above-described fourth embodiment in that the vertical cross-sectional shape of the inner wall of the conical portion 8 forming the rear of the exhaust chamber 15 can be generated by any one of: a single circular arc, as shown in FIG. 4; or a smoothly connected shape consisting of at least one straight line segment and at least one circular arc connected by angles $\phi_i$ (where $_i$=1, 2, 3 . . . ) of at least 140 degrees, as shown in FIG. 5; or a linkage of adjacent straight line segments subtending angles of $\theta_i$ (where $_i$=1, 2, 3 . . . ) of at least 140 degrees, as shown in FIG. 6; but it is further characterized in that the ratio L/D of the axial length L between a central position of the last-stage turbine rotor blades 47 and the rearmost portion of the conical portion 9 to the blade-tip diameter D of the last-stage turbine rotor blades is within the range of 0.32 to 0.48, as shown in FIG. 8.

Figure 18:
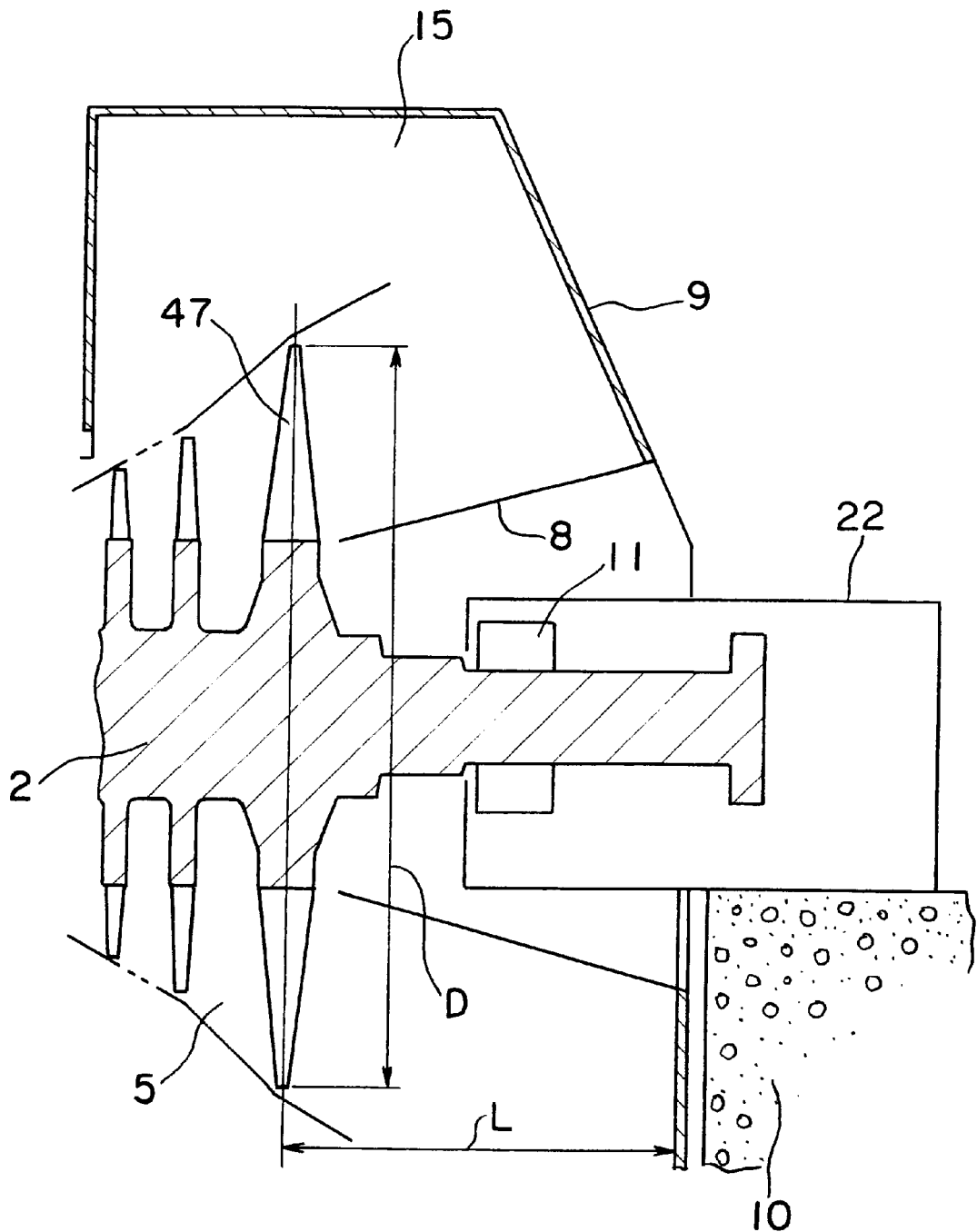
FIG. 18 is a view illustrating the definition of the axial length L of the exhaust chamber, when the downstream-side wall of the upper half of the exhaust chamber is inclined.
Figure 1:
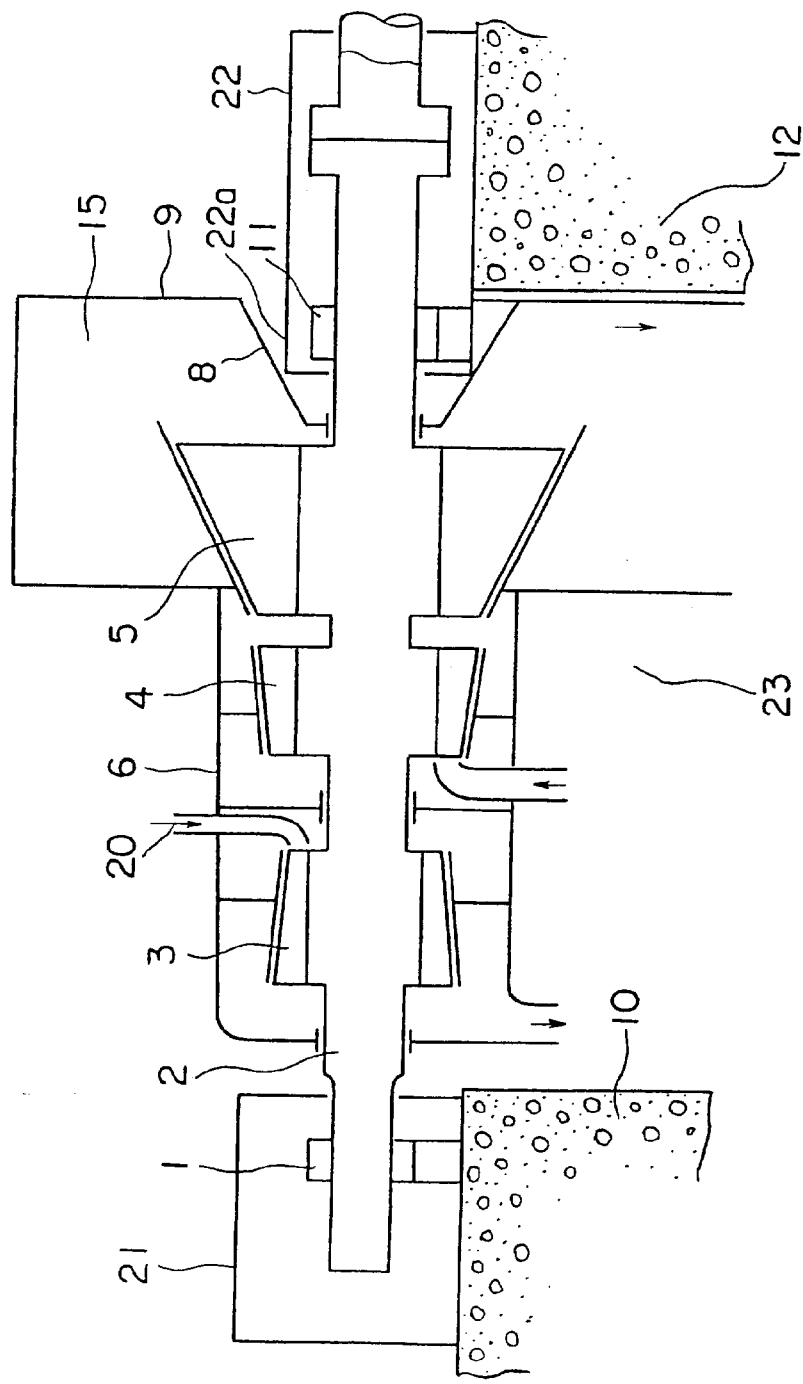
Figure 3:
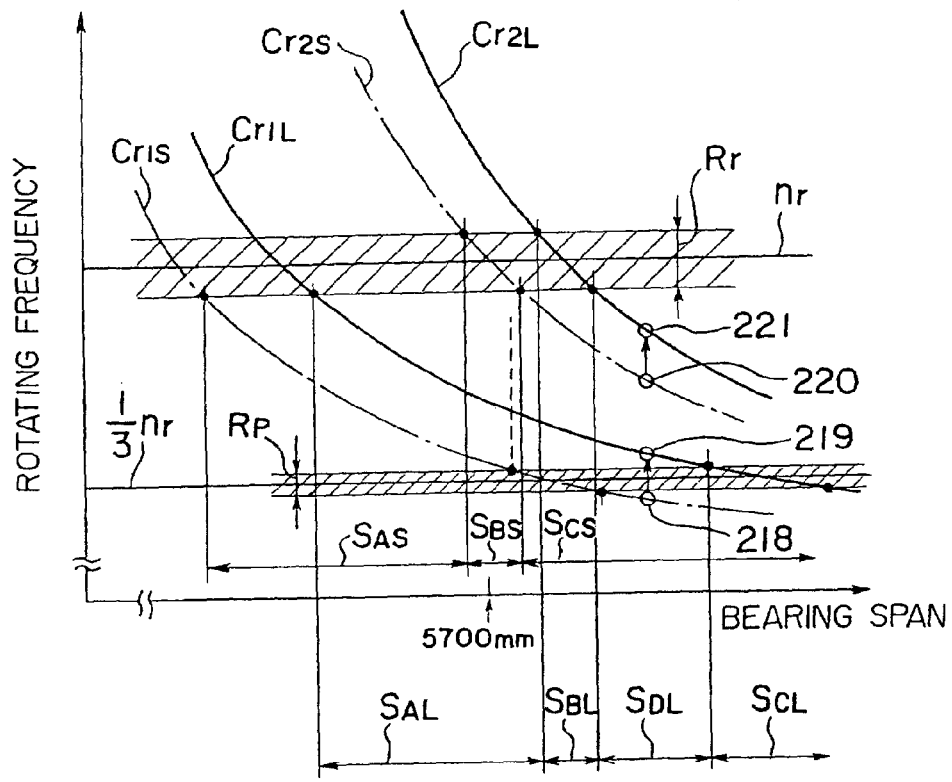

Note that if the downstream-side wall of the upper half of the exhaust chamber is inclined, as shown in FIG. 18, the axial length L of the exhaust chamber is defined as the maximum axial length of the exhaust chamber, taking the axial length of the lower half thereof in FIG. 18.

The graph of FIG. 19 shows an example of the results of a comparison between the exhaust efficiency of a curved-surface exhaust chamber in accordance with this embodiment, in which the exhaust chamber conical portion 8 is curved as shown in FIG. 5 and L/D is restricted to the range of 0.32 to 0.48, and the exhaust efficiency of a prior-art exhaust chamber, in which the conical portion of the exhaust chamber is a circular cone and L/D is 0.5 or greater. In this case, ZA denotes an exhaust loss curve that illustrates the exhaust efficiency of the prior-art exhaust chamber in which the conical portion of the exhaust chamber is a circular cone, ZB denotes an exhaust loss curve that illustrates the exhaust efficiency of the curved-surface exhaust chamber wherein the exhaust chamber conical portion 8 is curved as shown in FIG. 5, and τ/τ o denotes the exhaust loss ratio.

As can be seen from FIG. 19, setting the ratio L/D of the curved-surface exhaust chamber indicated by ZB to within the range of 0.32 to 0.48 makes it possible to provide a high/low-pressure integrated steam turbine that has an exhaust efficiency which is at least equal to that of the prior-art cone-shaped exhaust chamber having an L/D ratio of 0.5 or greater. More specifically, the exhaust flow can be smoothed and the axial distance shortened by forming the conical portion of the exhaust chamber as a curved surface or an approximation to a curved surface. In particular, it is possible to provide a compact high/low-pressure integrated steam turbine that has a superb efficiency and operability at higher temperatures, pressures, and power outputs, without causing any large drop in the critical speeds and without consequent large amounts of shaft vibration, by combining a curved-surface exhaust chamber of a shape generated by a single circular arc, or a curved-surface exhaust chamber of a shape generated by a smoothly connected shape consisting of at least one straight line segment and at least one circular arc connected by angles $\phi_i$ (where $_i$=1, 2, 3 . . . ) of at least 140 degrees, or an approximately curved-surface exhaust chamber of a shape generated by a linkage of adjacent straight line segments subtending angles of $\theta_i$ (where $_i$=1, 2, 3 . . . ) of at least 140 degrees, together with a smoothening of the exhaust flow and a shortening of the axial distance within the exhaust chamber (while maintaining the exhaust efficiency at at least the same as that of the prior art) by setting the ratio L/D of the length L of the exhaust chamber to the blade-tip diameter D of the low-pressure last-stage rotor blades (LSB) to within the range of 0.32 to 0.48, thus shortening the bearing span of the turbine.

Figure 7:
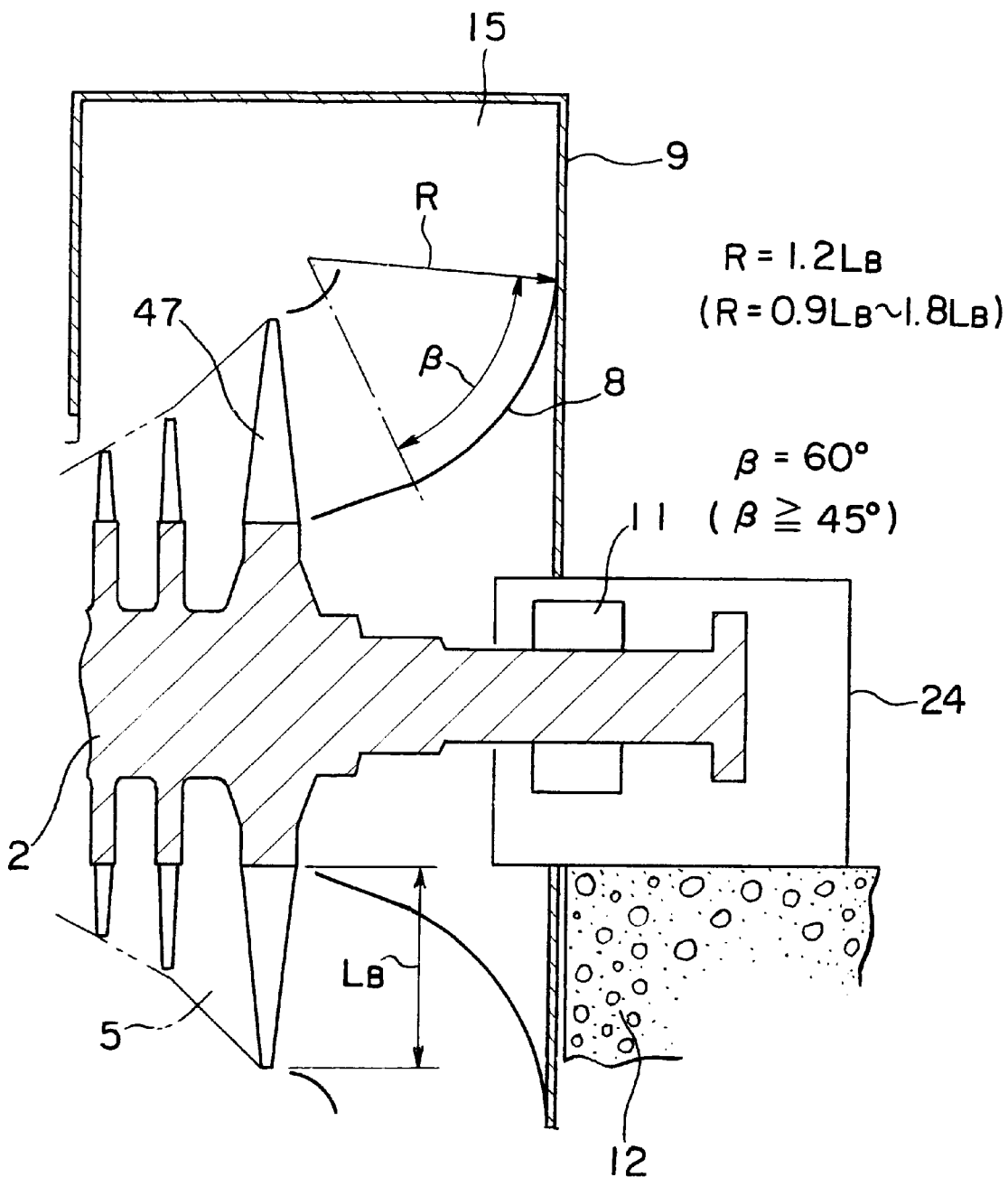
FIG. 7 is a cross-sectional view of a sixth embodiment of the steam turbine of this invention.

A sixth embodiment of this invention will now be described with reference to FIG. 7. This embodiment corresponds to the previous sections on Technical Problem (6) and the sixth aspect of this invention.

This embodiment is based on the characteristic feature of the above-described fourth embodiment in that the vertical cross-sectional shape of the inner wall of the conical portion 8 forming the rear of the exhaust chamber 15 can be generated by any one of: a single circular arc, as shown in FIG. 4; or a smoothly connected shape consisting of at least one straight line segment and at least one circular arc connected by angles $\phi_i$ (where $_i$=1, 2, 3 . . . ) of at least 140 degrees, as shown in FIG. 5; or a linkage of adjacent straight line segments subtending angles of $\theta_i$ (where $_i$=1, 2, 3 . . . ) of at least 140 degrees, as shown in FIG. 6; but it is further characterized in that at least one circular arc forming the vertical cross-sectional shape of the inner wall of the conical portion 8 has a radius of curvature R that is within the range of 0.9 times to 1.8 times the blade length LB of the last-stage turbine rotor blades 47, or it has a central angle β of at least 45 degrees. This makes it possible to increase the stiffness of the shaft assembly and thus detune the critical speeds, thereby ensuring the stability of the shaft assembly, by devising a countermeasure that shortens the bearing span.

That is to say, in a high-temperature, high-pressure, high-output, high/low-pressure integrated steam turbine that satisfies both the "high-temperature, high-pressure, high-output conditions" and the "single turbine rotor condition," the exhaust chamber is configured in such a manner that the exhaust chamber conical portion is a curved surface or an approximation to a curved surface and the radius of curvature R of a curved-surface cone of the exhaust chamber is set to within the range of 0.9 times to 1.8 times the blade length LB of the last-stage turbine rotor blades (LSB), or the curved surface covers a range extending over at least 45 degrees that is the angle at the vertical cross-sectional surface of the exhaust chamber conical portion. This allows the exhaust flow to exit smoothly and thus prevent any loss of exhaust efficiency, enables a shortening of the axial-direction distance of the exhaust chamber by ensuring an exhaust efficiency that is at least equal to the favorable exhaust efficiency of a prior-art exhaust chamber having a cone portion that has a linear circular-cone shape and wherein L/D is 0.5 or greater, and, as a result, makes it possible to implement a high/low-pressure integrated steam turbine wherein the bearing span is shortened, the secondary critical speed is sufficiently detuned, and axial vibration is suppressed to a low level.

In comparison with an exhaust chamber conical portion of a prior-art circular-cone shape (see FIG. 17, etc), the configuration of an exhaust chamber (see FIG. 7) wherein the radius of curvature R of the curved-surface cone of the exhaust chamber (which is a curved-surface exhaust chamber in which the exhaust chamber conical portion is provided with curvature) is set to within the range of 0.9 times to 1.8 times the blade length of the last-stage turbine rotor blades (LSB), or the curved surface covers a range extending over at least 45 degrees that is the angle at the vertical cross-sectional surface of the exhaust chamber conical portion, makes it possible to ensure favorable vibration characteristics while maintaining the exhaust efficiency. Therefore, applying this curved-surface exhaust chamber to a high-temperature, high-pressure, high-output, high/low-pressure integrated steam turbine makes it possible to suppress any increase in the bearing span due to an increase in the pressure or output, and prevent any drop in the critical speeds.

In a high-temperature, high-pressure, high-output, high/low-pressure integrated steam turbine that satisfies both the "high-temperature, high-pressure, high-output conditions" and the "single turbine rotor condition," therefore, the exhaust flow exits smoothly and thus any loss of exhaust efficiency is prevented, and also the axial-direction distance of the exhaust chamber is shortened by ensuring an exhaust efficiency that is at least equal to the favorable exhaust efficiency of a prior-art exhaust chamber having a cone portion that has a circular-cone shape and wherein L/D is 0.5 or greater, and, as a result, it is possible to implement a high/low-pressure integrated steam turbine wherein the bearing span is shortened, the critical speeds are detuned, and stability can be ensured.

In this manner, since the configuration is such that a curved-surface exhaust chamber has a shape in which the vertical cross-sectional surface of the exhaust chamber conical portion is shaped as a curve or an approximation to a curve, and the radius of curvature R of the curved-surface cone of the exhaust chamber is set to within the range of 0.9 times to 1.8 times the blade length of the last-stage turbine rotor blades (LSB), or the curved surface covers a range extending over at least 45 degrees that is the angle at the vertical cross-sectional surface of the exhaust chamber conical portion, it is possible to provide a compact high-temperature, high-pressure, high-output, high/low-pressure integrated steam turbine which suppresses any increase in the bearing span due to an increase in the pressure or output while exhaust efficiency is ensured, and prevents any drop in the critical speeds.

Figure 9:
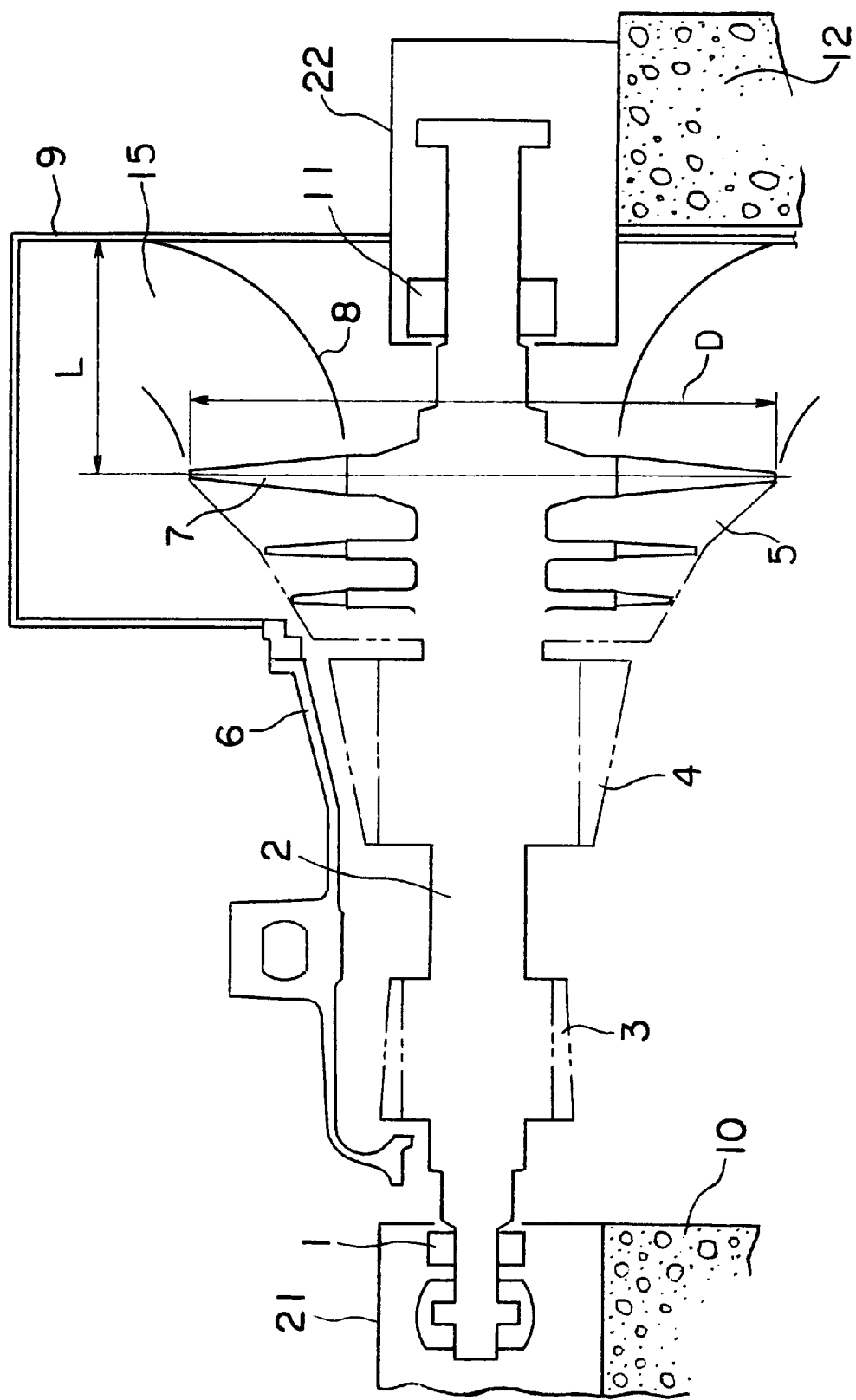
FIG. 9 is a cross-sectional view of an embodiment that is a combination of the first and the fourth, fifth, or sixth embodiment of the steam turbine of this invention.
Figure 11:
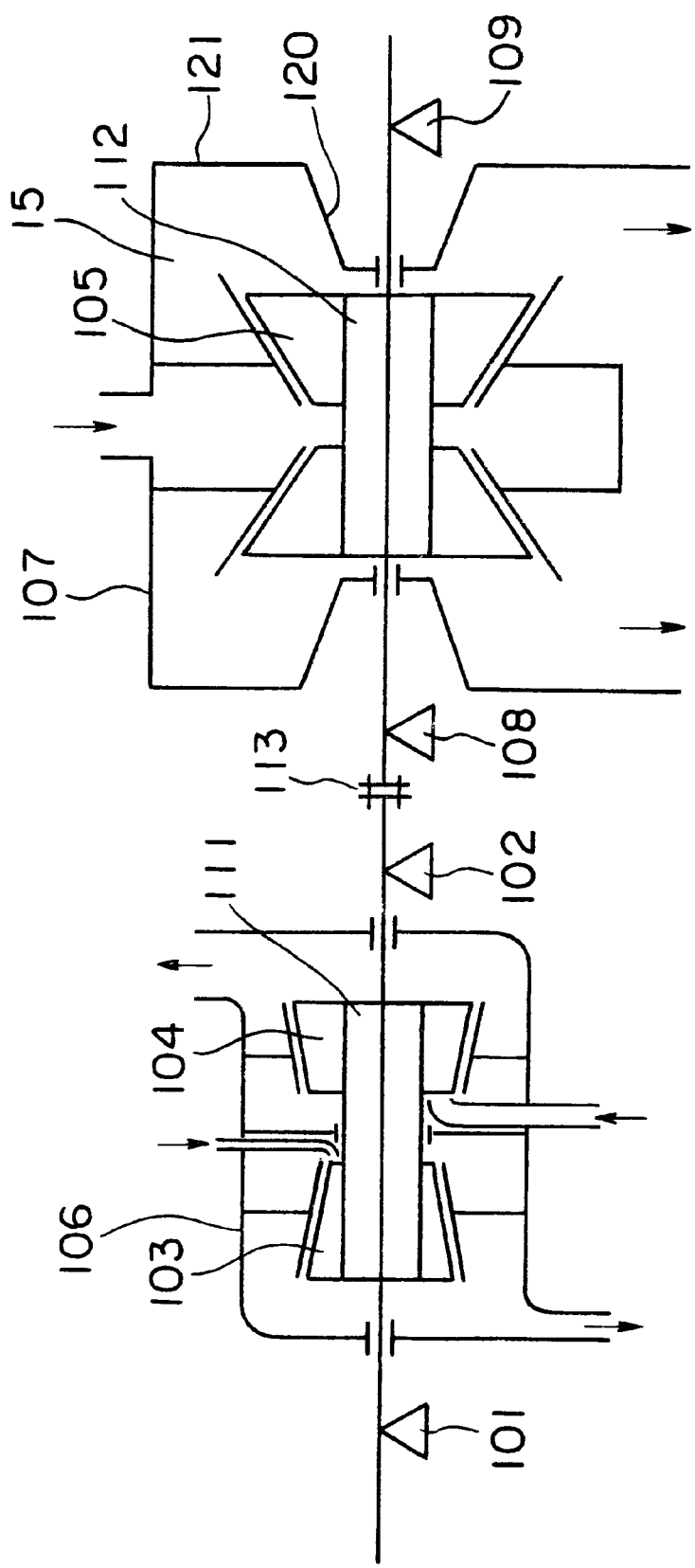
FIG. 11 is a cross-sectional view through a prior-art steam turbine.
Figure 13:
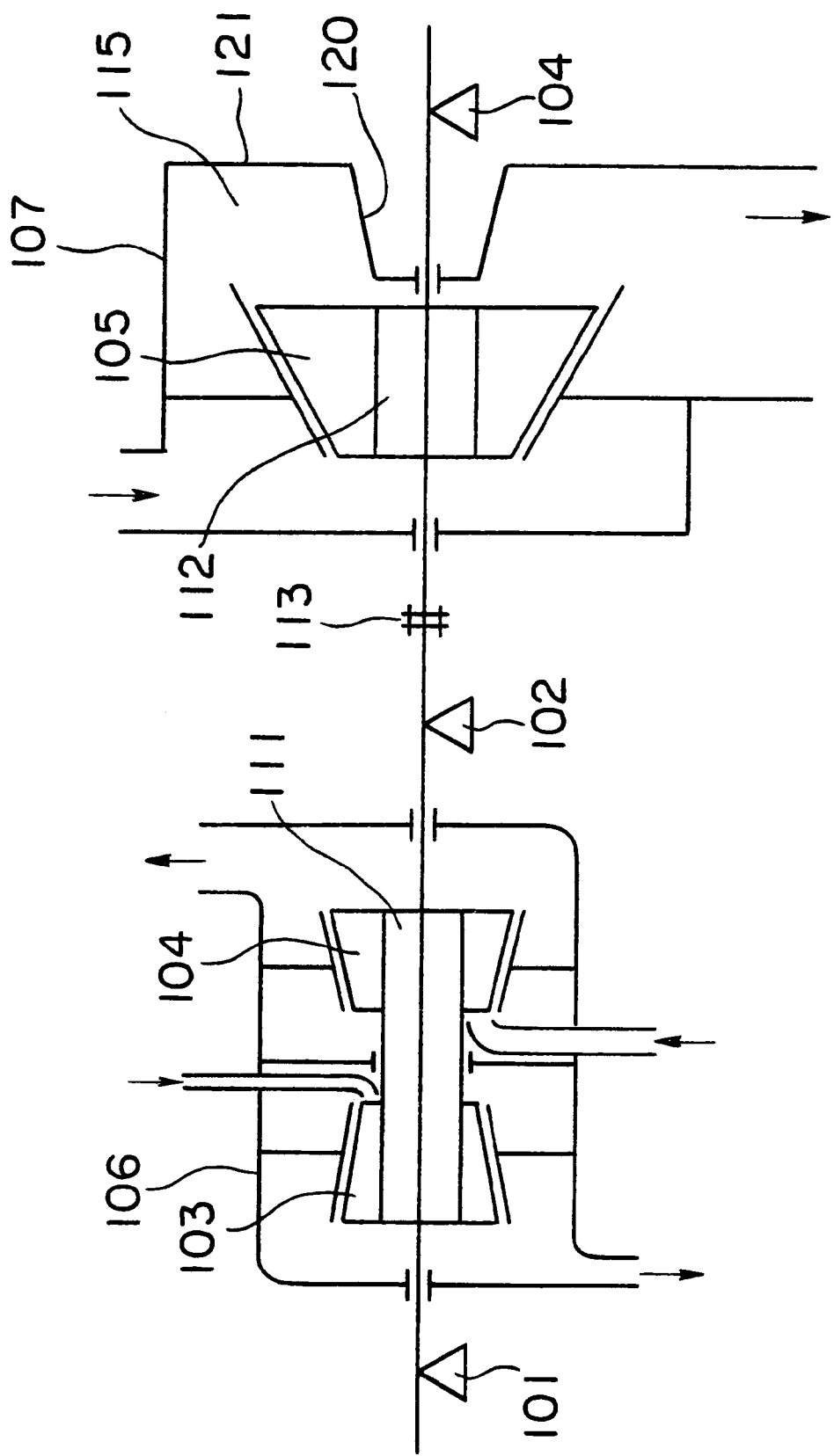
FIG. 13 is a cross-sectional view through a prior-art steam turbine.

It should be noted that the above described embodiments of the present invention can be combined. For instance, a further embodiment of this invention shown in FIG. 9 is a combination of the first embodiment and one of the fourth, fifth, and sixth embodiments.

As described above, the present invention makes it possible to design a practicable high-temperature, high-pressure, high-output, high/low-pressure integrated steam turbine that satisfies both the "high-temperature, high-pressure, high-output conditions" and the "single turbine rotor condition."

What is claimed is:

1. A steam turbine comprising:
   a high-pressure turbine to which primary steam is supplied;
   a low-pressure turbine on a final-stage side of said high-pressure turbine and having last-stage turbine rotor blades;
   a turbine rotor formed as an integral rotor member by which said high-pressure turbine and said low-pressure turbine are coupled;
   an integral casing within which said high-pressure turbine and said low-pressure turbine are accommodated;
   a downward-exhaust type of exhaust chamber formed in said casing for exhausting in a downward direction exhaust steam that is expelled from said low-pressure turbine;
   a high-pressure-side journal bearing for supporting said turbine rotor in a rotatable manner on an initial-stage side of said high-pressure turbine; and
   a low-pressure-side journal bearing for supporting said turbine rotor in a rotatable manner on a final-stage side of said high-pressure turbine; wherein:
   said primary steam has a steam pressure of at least 100 kg/cm$^2$ and a steam temperature of at least 500° C.;
   said steam turbine has a rated power of at least 100 MW;
   said last-stage turbine rotor blades are rotor blades of an effective blade length of at least 36 inches rotating at 3000 rpm; and
   the vertical cross-sectional shape of an inner wall of a conical portion forming a rear portion of said exhaust chamber is a shape generated by a single circular arc.

2. The steam turbine as defined in claim 1, wherein a bearing that is one of said high-pressure-side journal bearing and said lower-pressure-side journal bearing is installed in a foundation portion of which at least one portion of said casting is provided, and the other bearing is installed at a distance from said foundation portion.

3. The steam turbine as defined in claim 1, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

4. A steam turbine comprising:
   a high-pressure turbine to which primary steam is supplied;
   a low-pressure turbine on a final-stage side of said high-pressure turbine and having last-stage turbine rotor blades;
   a turbine rotor formed as an integral rotor member by which said high-pressure turbine and said low-pressure turbine are coupled;
   an integral casing within which said high-pressure turbine and said low-pressure turbine are accommodated;
   a downward-exhaust type of exhaust chamber formed in said casing for exhausting in a downward direction exhaust steam that is expelled from said low-pressure turbine;
   a high-pressure-side journal bearing for supporting said turbine rotor in a rotatable manner on an initial-stage side of said high-pressure turbine; and
   a low-pressure-side journal bearing for supporting said turbine rotor in a rotatable manner on a final-stage side of said high-pressure turbine; wherein:

said primary steam has a steam pressure of at least 100 kg/cm² and a steam temperature of at least 500° C.;

said steam turbine has a rated power of at least 100 MW;

said last-stage turbine rotor blades are rotor blades of an effective blade length of at least 36 inches rotating at 3000 rpm; and the vertical cross-sectional shape of an inner wall of a conical portion forming a rear portion of said exhaust chamber is a shape generated by a smoothly connected line consisting of at least one straight line segment and at least one circular arc subtending angles of at least 140 degrees.

5. The steam turbine as defined in claim 4, wherein a bearing that is one of said high-pressure-side journal bearing and said lower-pressure-side journal bearing is installed in a foundation portion of which at least one portion of said casting is provided, and the other bearing is installed at a distance from said foundation portion.

6. The steam turbine as defined in claim 4, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

7. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm² and a steam temperature of at least 500° C.;

said steam turbine has a rated power of at least 100 MW;

said last-stage turbine rotor blades are rotor blades of an effective blade length of at least 36 inches rotating at 3000 rpm; and the vertical cross-sectional shape of an inner wall of a conical portion forming a rear portion of said exhaust chamber is a shape generated by a smoothly connected line such that a plurality of straight lines mutually subtend angles of at least 140 degrees.

8. The steam turbine as defined in claim 7, wherein a bearing that is one of said high-pressure-side journal bearing and said lower-pressure-side journal bearing is installed in a foundation portion of which at least one portion of said casting is provided, and the other bearing is installed at a distance from said foundation portion.

9. The steam turbine as defined in claim 7, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

10. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm² and a steam temperature of at least 500° C.;

said steam turbine has a rated power of at least 100 MW;

said last-stage turbine rotor blades are rotor blades of an effective blade length of at least 33.5 inches rotating at 3600 rpm; and the vertical cross-sectional shape of an inner wall of a conical portion forming a rear portion of said exhaust chamber is a shape generated by a single circular arc.

11. The steam turbine as defined in claim 10, wherein a bearing that is one of said high-pressure-side journal bearing and said lower-pressure-side journal bearing is installed in a foundation portion of which at least one portion of said casting is provided, and the other bearing is installed at a distance from said foundation portion.

12. The steam turbine as defined in claim 10, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

13. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm$^2$ and a steam temperature of at least 500° C.;

said steam turbine has a rated power of at least 100 MW;

said last-stage turbine rotor blades are rotor blades of an effective blade length of at least 33.5 inches rotating at 3600 rpm; and the vertical cross-sectional shape of an inner wall of a conical portion forming a rear portion of said exhaust chamber is a shape generated by a smoothly connected line consisting of at least one straight line segment and at least one circular arc subtending angles of at least 140 degrees.

14. The steam turbine as defined in claim 13, wherein a bearing that is one of said high-pressure-side journal bearing and said lower-pressure-side journal bearing is installed in a foundation portion of which at least one portion of said casting is provided, and the other bearing is installed at a distance from said foundation portion.

15. The steam turbine as defined in claim 13, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

16. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm$^2$ and a steam temperature of at least 500° C.;

said steam turbine has a rated power of at least 100 MW;

said last-stage turbine rotor blades are rotor blades of an effective blade length of at least 33.5 inches rotating at 3600 rpm; and the vertical cross-sectional shape of an inner wall of a conical portion forming a rear portion of said exhaust chamber is a shape generated by a smoothly connected line such that a plurality of straight lines mutually subtend angles of at least 140 degrees.

17. The steam turbine as defined in claim 16, wherein a bearing that is one of said high-pressure-side journal bearing and said lower-pressure-side journal bearing is installed in a foundation portion of which at least one portion of said casting is provided, and the other bearing is installed at a distance from said foundation portion.

18. The steam turbine as defined in claim 16, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

19. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm$^2$ and a steam temperature of at least 500° C.;

said steam turbine has a rated power of at least 100 MW;

said last-stage turbine rotor blades are rotor blades of an effective blade length of at least 36 inches rotating at 3000 rpm;

the vertical cross-sectional shape of an inner wall of a conical portion forming a rear portion of said exhaust chamber is a shape generated by a single circular arc; and the ratio L/D of the axial length L between a central position of said last-stage turbine rotor blades and a rearmost portion of said conical portion to the blade-tip diameter D of said last-stage turbine rotor blades is within the range of 0.32 to 0.48.

20. The steam turbine as defined in claim 19, wherein a bearing that is one of said high-pressure-side journal bearing and said lower-pressure-side journal bearing is installed in a foundation portion of which at least one portion of said casting is provided, and the other bearing is installed at a distance from said foundation portion.

21. The steam turbine as defined in claim 19, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

22. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm$^2$ and a steam temperature of at least 500° C.;

said steam turbine has a rated power of at least 100 MW;

said last-stage turbine rotor blades are rotor blades of an effective blade length of at least 36 inches rotating at 3000 rpm;

the vertical cross-sectional shape of an inner wall of a conical portion forming a rear portion of said exhaust chamber is a shape generated by a smoothly connected line consisting of at least one straight line segment and at least one circular arc subtending angles of at least 140 degrees; and the ratio L/D of the axial length L between a central position of said last-stage turbine rotor blades and a rearmost portion of said conical portion to the blade-tip diameter D of said last-stage turbine rotor blades is within the range of 0.32 to 0.48.

23. The steam turbine as defined in claim 22, wherein a bearing that is one of said high-pressure-side journal bearing and said lower-pressure-side journal bearing is installed in a foundation portion of which at least one portion of said casing is provided, and the other bearing is installed at a distance from said foundation portion.

24. The steam turbine as defined in claim 22, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

25. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm$^2$ and a steam temperature of at least 500° C.;

said steam turbine has a rated power of at least 100 MW;

said last-stage turbine rotor blades are rotor blades of an effective blade length of at least 36 inches rotating at 3000 rpm;

the vertical cross-sectional shape of an inner wall of a conical portion forming a rear portion of said exhaust chamber is a shape generated by a smoothly connected line such that a plurality of straight lines mutually subtend angles of at least 140 degrees; and the ratio L/D of the axial length L between a central position of said last-stage turbine rotor blades and a rearmost portion of said conical portion to the blade-tip diameter D of said last-stage turbine rotor blades is within the range of 0.32 to 0.48.

26. The steam turbine as defined in claim 25, wherein a bearing that is one of said high-pressure-side journal bearing and said lower-pressure-side journal bearing is installed in a foundation portion of which at least one portion of said casing is provided, and the other bearing is installed at a distance from said foundation portion.

27. The steam turbine as defined in claim 25, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

28. A steam turbine comprising:

a high-pressure turbine to which primary steam is supplied;

a low-pressure turbine on a final-stage side of said high-pressure turbine and having last-stage turbine rotor blades;

a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm$^2$ and a steam temperature of at least 500° C.;

said steam turbine has a rated power of at least 100 MW;

said last-stage turbine rotor blades are rotor blades of an effective blade length of at least 33.5 inches rotating at 3600 rpm;

the vertical cross-sectional shape of an inner wall of a conical portion forming a rear portion of said exhaust chamber is a shape generated by a single circular arc; and the ratio L/D of the axial length L between a central position of said last-stage turbine rotor blades and a rearmost portion of said conical portion to the blade-tip diameter D of said last-stage turbine rotor blades is within the range of 0.32 to 0.48.

29. The steam turbine as defined in claim 28, wherein a bearing that is one of said high-pressure-side journal bearing and said lower-pressure-side journal bearing is installed in a foundation portion of which at least one portion of said casing is provided, and the other bearing is installed at a distance from said foundation portion.

30. The steam turbine as defined in claim 28, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

31. A steam turbine comprising:
   a high-pressure turbine to which primary steam is supplied;
   a low-pressure turbine on a final-stage side of said high-pressure turbine and having last-stage turbine rotor blades;
   a turbine rotor formed as an integral rotor member by which said high-pressure turbine and said low-pressure turbine are coupled;
   an integral casing within which said high-pressure turbine and said low-pressure turbine are accommodated;
   a downward-exhaust type of exhaust chamber formed in said casing for exhausting in a downward direction exhaust steam that is expelled from said low-pressure turbine;
   a high-pressure-side journal bearing for supporting said turbine rotor in a rotatable manner on an initial-stage side of said high-pressure turbine; and
   a low-pressure-side journal bearing for supporting said turbine rotor in a rotatable manner on a final-stage side of said high-pressure turbine; wherein:
      said primary steam has a steam pressure of at least 100 kg/cm$^2$ and a steam temperature of at least 500° C.;
      said steam turbine has a rated power of at least 100 MW;
      said last-stage turbine rotor blades are rotor blades of an effective blade length of at least 33.5 inches rotating at 3600 rpm;
      the vertical cross-sectional shape of an inner wall of a conical portion forming a rear portion of said exhaust chamber is a shape generated by a smoothly connected line consisting of at least one straight line segment and at least one circular arc subtending angles of at least 140 degrees; and
      the ratio L/D of the axial length L between a central position of said laststage turbine rotor blades and a rearmost portion of said conical portion to the blade-tip diameter D of said last-stage turbine rotor blades is within the range of 0.32 to 0.48.

32. The steam turbine as defined in claim 31, wherein a bearing that is one of said high-pressure-side journal bearing and said lower-pressure-side journal bearing is installed in a foundation portion of which at least one portion of said casing is provided, and the other bearing is installed at a distance from said foundation portion.

33. The steam turbine as defined in claim 31, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

34. A steam turbine comprising:
   a high-pressure turbine to which primary steam is supplied;
   a low-pressure turbine on a final-stage side of said high-pressure turbine and having last-stage turbine rotor blades;
   a turbine rotor formed as an integral rotor member by which said high-pressure turbine and said low-pressure turbine are coupled;
   an integral casing within which said high-pressure turbine and said low-pressure turbine are accommodated;
   a downward-exhaust type of exhaust chamber formed in said casing for exhausting in a downward direction exhaust steam that is expelled from said low-pressure turbine;
   a high-pressure-side journal bearing for supporting said turbine rotor in a rotatable manner on an initial-stage side of said high-pressure turbine; and
   a low-pressure-side journal bearing for supporting said turbine rotor in a rotatable manner on a final-stage side of said high-pressure turbine; wherein:
      said primary steam has a steam pressure of at least 100 kg/cm$^2$ and a steam temperature of at least 500° C.;
      said steam turbine has a rated power of at least 100 MW;
      said last-stage turbine rotor blades are rotor blades of an effective blade length of at least 33.5 inches rotating at 3600 rpm;
      the vertical cross-sectional shape of an inner wall of a conical portion forming a rear portion of said exhaust chamber is a shape generated by a smoothly connected line such that a plurality of straight lines mutually subtend angles of at least 140 degrees; and
      the ratio L/D of the axial length L between a central position of said last-stage turbine rotor blades and a rearmost portion of said conical portion to the blade-tip diameter D of said last-stage turbine rotor blades is within the range of 0.32 to 0.48.

35. The steam turbine as defined in claim 34, wherein a bearing that is one of said high-pressure-side journal bearing and said lower-pressure-side journal bearing is installed in a foundation portion of which at least one portion of said casing is provided, and the other bearing is installed at a distance from said foundation portion.

36. The steam turbine as defined in claim 34, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

37. A steam turbine comprising:
   a high-pressure turbine to which primary steam is supplied;
   a low-pressure turbine on a final-stage side of said high-pressure turbine and having last-stage turbine rotor blades;
   a turbine rotor formed as an integral rotor member by which said high-pressure turbine and said low-pressure turbine are coupled;
   an integral casing within which said high-pressure turbine and said low-pressure turbine are accommodated;
   a downward-exhaust type of exhaust chamber formed in said casing for exhausting in a downward direction exhaust steam that is expelled from said low-pressure turbine;
   a high-pressure-side journal bearing for supporting said turbine rotor in a rotatable manner on an initial-stage side of said high-pressure turbine; and
   a low-pressure-side journal bearing for supporting said turbine rotor in a rotatable manner on a final-stage side of said high-pressure turbine; wherein:
      said primary steam has a steam pressure of at least 100 kg/cm$^2$ and a steam temperature of at least 500° C.;
      said steam turbine has a rated power of at least 100 MW;
      said last-stage turbine rotor blades are rotor blades of an effective blade length of at least 36 inches rotating at 3000 rpm;

the vertical cross-sectional shape of an inner wall of a conical portion forming a rear portion of said exhaust chamber is a shape generated by a single circular arc; and at least one circular arc forming said vertical cross-sectional shape of said inner wall of said conical portion has a radius of curvature within the range of 0.9 times to 1.8 times the blade length of said last-stage turbine rotor blades, or it has a central angle β of at least 45 degrees.

38. The steam turbine as defined in claim 37, wherein a bearing that is one of said high-pressure-side journal bearing and said lower-pressure-side journal bearing is installed in a foundation portion of which at least one portion of said casting is provided, and the other bearing is installed at a distance from said foundation portion.

39. The steam turbine as defined in claim 37, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

40. A steam turbine comprising:
a high-pressure turbine to which primary steam is supplied;
a low-pressure turbine on a final-stage side of said high-pressure turbine and having last-stage turbine rotor blades;
a turbine rotor formed as an integral rotor member by which said high-pressure turbine and said low-pressure turbine are coupled;
an integral casing within which said high-pressure turbine and said low-pressure turbine are accommodated;
a downward-exhaust type of exhaust chamber formed in said casing for exhausting in a downward direction exhaust steam that is expelled from said low-pressure turbine;
a high-pressure-side journal bearing for supporting said turbine rotor in a rotatable manner on an initial-stage side of said high-pressure turbine; and
a low-pressure-side journal bearing for supporting said turbine rotor in a rotatable manner on a final-stage side of said high-pressure turbine; wherein:
said primary steam has a steam pressure of at least 100 kg/cm$^2$ and a steam temperature of at least 500° C.;
said steam turbine has a rated power of at least 100 MW;
said last-stage turbine rotor blades are rotor blades of an effective blade length of at least 36 inches rotating at 3000 rpm;
the vertical cross-sectional shape of an inner wall of a conical portion forming a rear portion of said exhaust chamber is a shape generated by a smoothly connected line consisting of at least one straight line segment and at least one circular arc subtending angles of at least 140 degrees; and
at least one circular arc forming said vertical cross-sectional shape of said inner wall of said conical portion has a radius of curvature within the range of 0.9 times to 1.8 times the blade length of said last-stage turbine rotor blades, or it has a central angle β of at least 45 degrees.

41. The steam turbine as defined in claim 40, wherein a bearing that is one of said high-pressure-side journal bearing and said lower-pressure-side journal bearing is installed in a foundation portion of which at least one portion of said casting is provided, and the other bearing is installed at a distance from said foundation portion.

42. The steam turbine as defined in claim 40, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

43. A steam turbine comprising:
a high-pressure turbine to which primary steam is supplied;
a low-pressure turbine on a final-stage side of said high-pressure turbine and having last-stage turbine rotor blades;
a turbine rotor formed as an integral rotor member by which said high-pressure turbine and said low-pressure turbine are coupled;
an integral casing within which said high-pressure turbine and said low-pressure turbine are accommodated;
a downward-exhaust type of exhaust chamber formed in said casing for exhausting in a downward direction exhaust steam that is expelled from said low-pressure turbine;
a high-pressure-side journal bearing for supporting said turbine rotor in a rotatable manner on an initial-stage side of said high-pressure turbine; and
a low-pressure-side journal bearing for supporting said turbine rotor in a rotatable manner on a final-stage side of said high-pressure turbine; wherein:
said primary steam has a steam pressure of at least 100 kg/cm$^2$ and a steam temperature of at least 500° C.;
said steam turbine has a rated power of at least 100 MW;
said last-stage turbine rotor blades are rotor blades of an effective blade length of at least 33.5 inches rotating at 3600 rpm;
the vertical cross-sectional shape of an inner wall of a conical portion forming a rear portion of said exhaust chamber is a shape generated by a single circular arc; and
at least one circular arc forming said vertical cross-sectional shape of said inner wall of said conical portion has a radius of curvature within the range of 0.9 times to 1.8 times the blade length of said last-stage turbine rotor blades, or it has a central angle β of at least 45 degrees.

44. The steam turbine as defined in claim 43, wherein a bearing that is one of said high-pressure-side journal bearing and said lower-pressure-side journal bearing is installed in a foundation portion of which at least one portion of said casting is provided, and the other bearing is installed at a distance from said foundation portion.

45. The steam turbine as defined in claim 43, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

46. A steam turbine comprising:
a high-pressure turbine to which primary steam is supplied;
a low-pressure turbine on a final-stage side of said high-pressure turbine and having last-stage turbine rotor blades;
a turbine rotor formed as an integral rotor member by which said high-pressure turbine and said low-pressure turbine are coupled;

an integral casing within which said high-pressure turbine and said low-pressure turbine are accommodated;

a downward-exhaust type of exhaust chamber formed in said casing for exhausting in a downward direction exhaust steam that is expelled from said low-pressure turbine;

a high-pressure-side journal bearing for supporting said turbine rotor in a rotatable manner on an initial-stage side of said high-pressure turbine; and a low-pressure-side journal bearing for supporting said turbine rotor in a rotatable manner on a final-stage side of said high-pressure turbine; wherein:

said primary steam has a steam pressure of at least 100 kg/cm$^2$ and a steam temperature of at least 500° C.;

said steam turbine has a rated power of at least 100 MW;

said last-stage turbine rotor blades are rotor blades of an effective blade length of at least 33.5 inches rotating at 3600 rpm;

the vertical cross-sectional shape of an inner wall of a conical portion forming a rear portion of said exhaust chamber is a shape generated by a smoothly connected line consisting of at least one straight line segment and at least one circular arc subtending angles of at least 140 degrees; and at least one circular arc forming said vertical cross-sectional shape of said inner wall of said conical portion has a radius of curvature within the range of 0.9 times to 1.8 times the blade length of said last-stage turbine rotor blades, or it has a central angle β of at least 45 degrees.

47. The steam turbine as defined in claim 46, wherein a bearing that is one of said high-pressure-side journal bearing and said lower-pressure-side journal bearing is installed in a foundation portion of which at least one portion of said casting is provided, and the other bearing is installed at a distance from said foundation portion.

48. The steam turbine as defined in claim 46, wherein said high-pressure turbine is configured in such a manner that at least one stage of a plurality of turbine stages extending from a first-high pressure stage to a last high-pressure stage of said high pressure turbine is made to be a partial pass-through stage (partial arc-admission stage).

* * * * *

UNITED STATES PATENT AND TRADEMARK OFFICE
CERTIFICATE OF CORRECTION

PATENT NO.    : 6,203,274 B1
DATED         : March 20, 2001
INVENTOR(S)   : Kikuchi et al.

Figure 10:
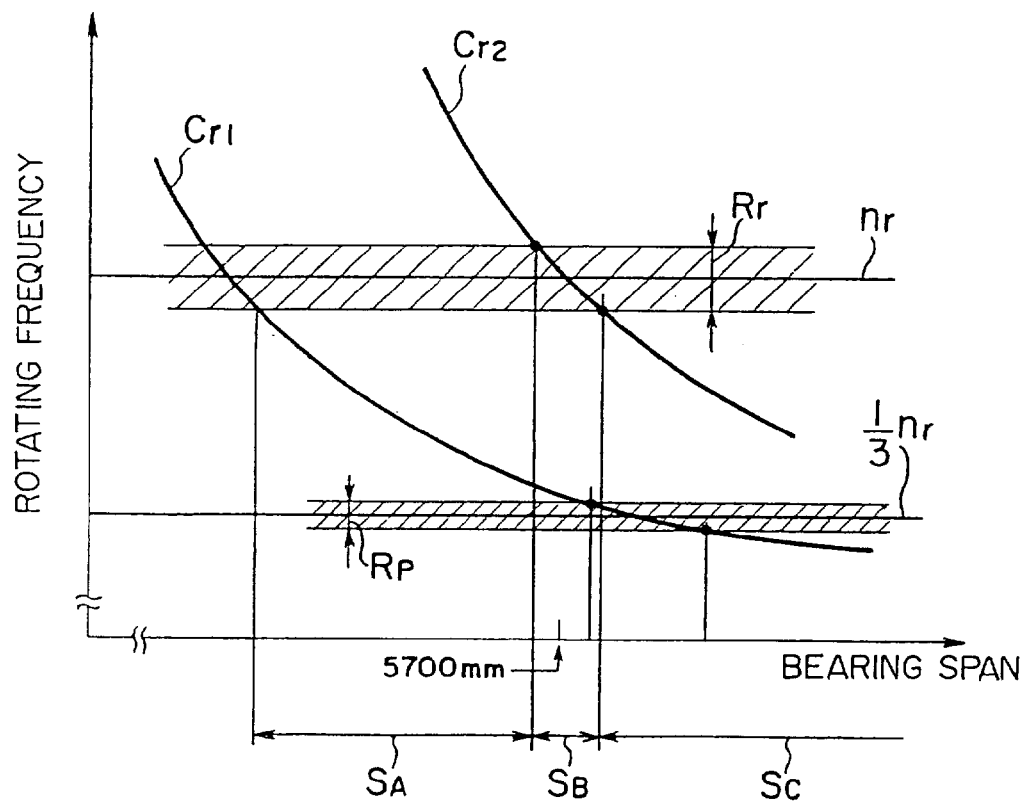
FIG. 10 is a graph illustrating the relationship between bearing span and rotational speed in general.

It is certified that error appears in the above-identified patent and that said Letters Patent is hereby corrected as shown below:

Drawings,
Please substitute the attached Figures 1, 3 and 10 for those appearing on drawing sheets 2 of 19, 3 of 19 and 10 of 19.

Signed and Sealed this

First Day of October, 2002

*Attest:*

*Attesting Officer*

JAMES E. ROGAN
*Director of the United States Patent and Trademark Office*